United States Patent
Bill

(10) Patent No.: US 7,764,311 B2
(45) Date of Patent: Jul. 27, 2010

(54) PERSONALIZING CONTENT BASED ON MOOD

(75) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 1581 days.

(21) Appl. No.: 11/025,881

(22) Filed: Dec. 30, 2004

(65) Prior Publication Data

US 2006/0143647 A1    Jun. 29, 2006

Related U.S. Application Data

(63) Continuation-in-part of application No. 10/448,469, filed on May 30, 2003, now abandoned, and a continuation-in-part of application No. 10/448,316, filed on May 30, 2003, now Pat. No. 7,243,104.

(51) Int. Cl.
   *H04N 5/228*    (2006.01)
(52) U.S. Cl. ............... 348/222.1; 345/619; 382/118; 382/103
(58) Field of Classification Search ............. 348/222.1; 345/619; 382/118, 603
   See application file for complete search history.

(56) References Cited

U.S. PATENT DOCUMENTS

| | | | |
|---|---|---|---|
| 6,584,220 B2 | 6/2003 | Lantrip et al. | |
| 6,933,432 B2 | 8/2005 | Shteyn et al. | |
| 6,993,532 B1 | 1/2006 | Platt et al. | |
| 2002/0083060 A1 | 6/2002 | Wang et al. | |
| 2002/0130898 A1 | 9/2002 | Ogawa et al. | |
| 2002/0188838 A1 | 12/2002 | Welder | |
| 2003/0014407 A1 | 1/2003 | Blatter et al. | |
| 2003/0033420 A1 | 2/2003 | Eyal et al. | |
| 2003/0040904 A1 | 2/2003 | Whitman et al. | |
| 2003/0060728 A1 | 3/2003 | Mandigo | |
| 2003/0078919 A1 | 4/2003 | Suzuki et al. | |
| 2003/0108241 A1* | 6/2003 | Colmenarez et al. | 382/181 |
| 2003/0164844 A1 | 9/2003 | Kravitz et al. | |
| 2003/0191816 A1 | 10/2003 | Landress et al. | |
| 2003/0221541 A1 | 12/2003 | Platt | |
| 2003/0236582 A1 | 12/2003 | Zamir et al. | |
| 2004/0002310 A1 | 1/2004 | Herley et al. | |
| 2004/0095359 A1* | 5/2004 | Simon et al. | 345/619 |
| 2004/0117239 A1 | 6/2004 | Mittal et al. | |
| 2004/0181401 A1 | 9/2004 | Pachet et al. | |
| 2004/0189691 A1 | 9/2004 | Jojic et al. | |
| 2005/0216529 A1 | 9/2005 | Ashtekar et al. | |
| 2005/0223328 A1 | 10/2005 | Ashtekar et al. | |

OTHER PUBLICATIONS

International Search Report and Written Opinion for International Application No. PCT/US06/49386, dated Apr. 17, 2008, 10 pages.
Steven Michael Pierce "Scorebot: Theory and Design of an Automated Film Scoring Application", thesis submitted in accordance with the requirement for the degree of Master of Arts, The University of Leeds, Department of Music, Aug. 2000.

* cited by examiner

*Primary Examiner*—Yogesh K Aggarwal
(74) *Attorney, Agent, or Firm*—Finnegan, Henderson, Farabow, Garrett & Dunner, LLP

(57) ABSTRACT

In order to increase the efficacy of a mood-based playlisting system, a mood sensor such as a camera may be used to provide mood information to the mood model. When the mood sensor includes a camera, a camera may be used to capture an image of the user. The image is analyzed to determine a mood for the user so that content may be selected responsive to the mood of the user.

18 Claims, 18 Drawing Sheets

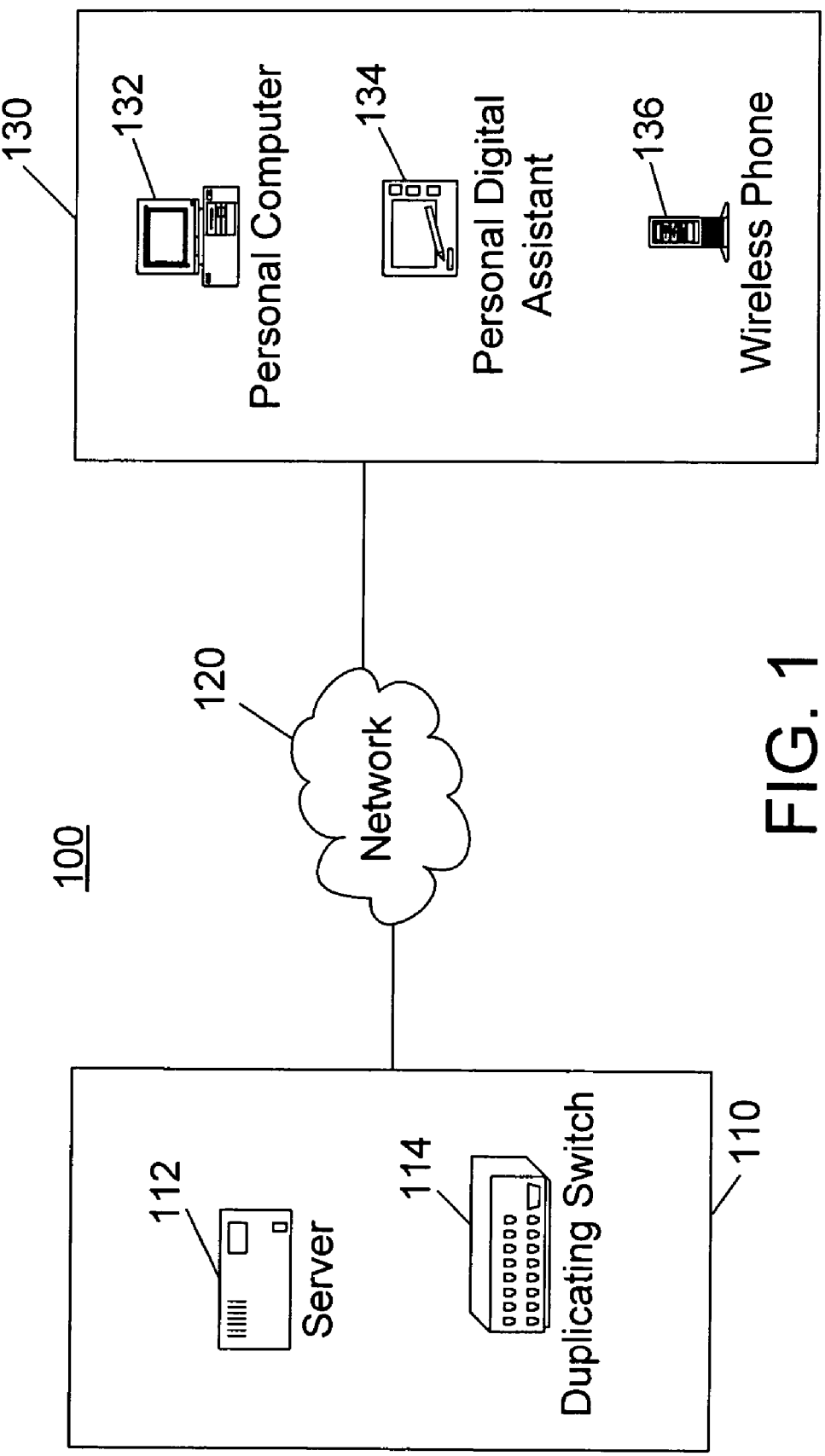

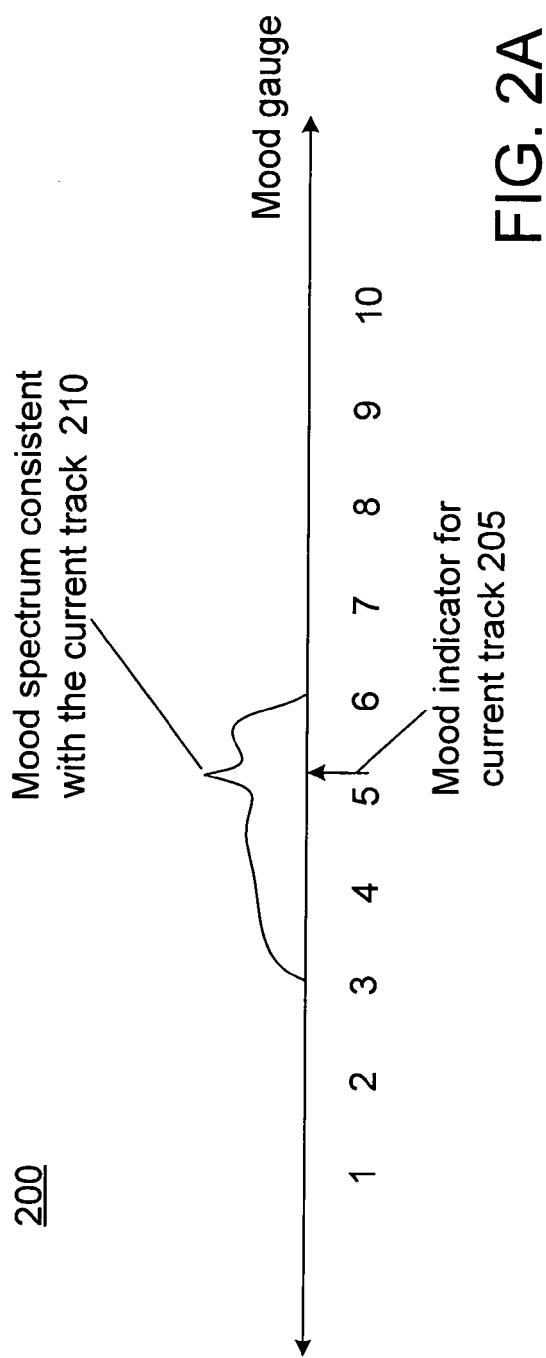
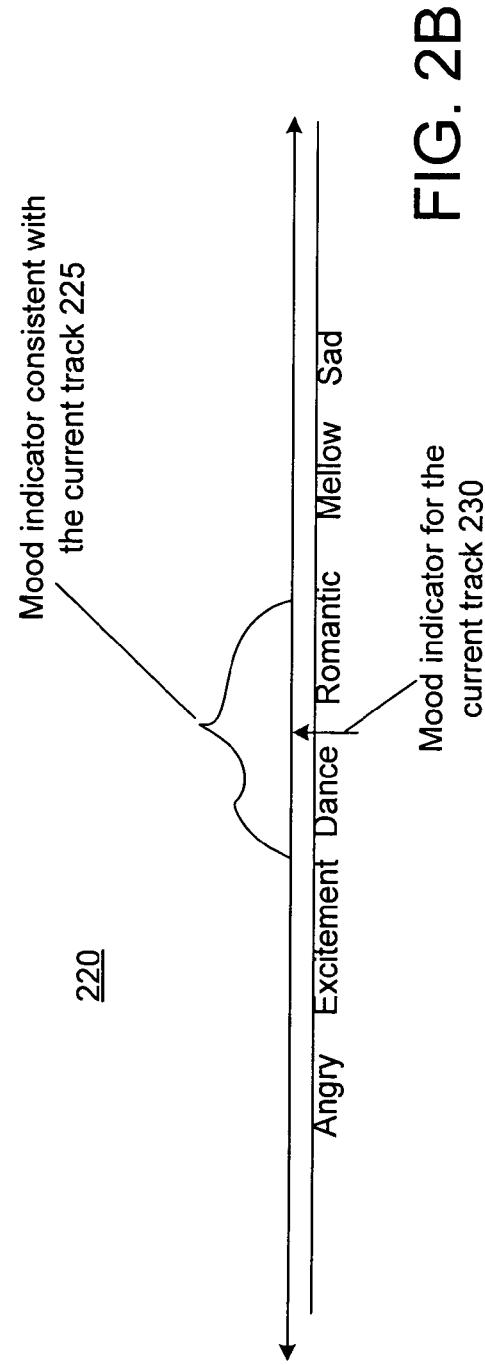

1100

- 1110 Position of Hairline
- 1111 Presence of hand on hair?
- 1112 Presence/type of hat?

- 1120 Presence/Position of wrinkles

- 1130 Presense/position of facial muscles and/or of tension in the muscles
- 1131 Orientation of eye structure

- 1140 Brow (presence of furrowed/unfurrowed brow)(position)

- 1150 Presense/position of mouth structure
- 1151 Angle of lips and side of mouth
- 1152 Can teeth be identified

- 1160 Presence/orientation of facial hair

User profile for SCREEN_NAME

1210 Position of Hairline
 Default Rule applies (forward =relaxed)
 (set back= tense (anger, anxiety, upset))
1211 Presence of hand on hair?
 Default Rule applies (if YES then SCREEN_NAME is tense)

1212 Presence/type of hat?
 IF baseball cap then mood = relaxed or happy

1220 Presence/Position of wrinkles
 If WRINKLES_EXIST_IN_FOREHEAD then MOOD = tense (anger, anxiety, upset)
 If VERTICAL_WRINKLES EXIST outside MOUTH then mood= anger
 If VERTICAL_WRINKLES_EXIST outside of EYE then mood=pain 1230 Presense/position of facial muscles and/or of tension in the muscles If CHEEK_TENSE then mood = business (anxiety, focus)
 If CHEEK_RELAXED then mood=NOT business and NOT tense 1231 Orientation of eye structure
 IF EYE_SQUINT then mood= nonresponsive (skeptical, dislike, pain)
 IF EYE_CLOSED then mood= slow (sleep, bored, relax)
 If EYE_WIDE_OPEN then mood= wonder (shock, amaze, curiosity)

1240 Brow (presence of furrowed/unfurrowed brow)(position)
 BROW_FURROWED=(BROW_DOWNWARD or BROW_ANGLE>45 degrees)
 If BROW_FURROWED then MOOD = tense
 BROW_UNFURROWED=BROW_UPWARD or BROW_ANGLE<45 degrees)
 If BROW_UNFURROWED then mood=relaxed or happy

1250 Presense/position of mouth structure
1251 Angle of lips and side of mouth
1252 Can teeth be identified
  SMILE=END_OF_MOUTH_POINTED_UP OR TEETH_TOGETHER
  If SMILE then mood= relaxed or happy
  BUT
    IF TEETH AND NOT_TOGETHER AND AUDIO_SIGNAL=YELL
      THEN mood=anger 1260 Presence/orientation of hair facial hair
  IF DREADLOCKS_EXIST then mood=REGGAE
  If UNSHAVEN then mood= NOT CLASSICAL or POP
  If FULL_BEARD then mood= (ROCK, METAL, COUNTRY)

1270 Miscellaneous
  IF PIPE then mood= RELAXED, CLASSICAL, JAZZ, NATIONAL_PUBLIC_RADIO 1280 PRIORITIZATION
  FAVOR business over happy
  FAVOR nonresponsive over tense
  IF KIDS_AROUND(AUDIO_SIGNAL, CAMERA) THEN NO METAL 1290 CUSTOMIZATION
  IN ROCK=EXCLUDE (ARTIST1, ARTIST2)
  IN TALK=EXCLUDE (TALK_SHOW_HOST_1)
  HAPPY=INCLUDES (METAL, ROCK)
  HAPPY=EXCLUDES (POP) UNLESS ARTIST3 OR SONG4

1340
Use MOOD_INDICATOR_LIBRARY to identify content selection in CONTENT_LIBRARY that supports MOOD_TRANSITION

1345
MOOD_INDICATOR_LIBRARY indicates that
if PLAY_ROCK_ADVERTISEMENT is played now, 50% of users will listen through end of commercial.
ADVERTISERS WILL NOT PAY FOR 50% LIKELIHOOD.
If intermediary track = HUEY_LEWIS then LIKELIHOOD=75%.
If intermediary track=BON_JOVI_LIVING_ON_A_PRAYER then LIKELIHOOD=90%.
COST PER HUEY_LEWIS LISTEN=$.001.
COST PER BON_JOVI_LIVING_ON_A_PRAYER=$.0011.

1350
REIMBURSEMENT FROM ADVERTISER AT 75%=$.002
REIMBURSEMENT FROM ADVERTISER AT 90%=$.003

1355
PLAY BON_JOVI_LIVING_ON_A_PRAYER
PREDICTED_mood=(happy, intense, upbeat, ROCK)

1360
Analyze Camera imagery
Camera indicates that ACTUAL_mood=(happy, intense, nonresponsive, ROCK)
RELATE PREDICTED_mood to ACTUAL_mood
MOOD1_AXIS(emotional state)=OK
MOOD2_AXIS(INTENSITY)=OK
MOOD3_AXIS (TEMPO)=FROM nonresponsive to upbeat
MOOD4_AXIS(GENRE)=OK

1365
Use MOOD_INDICATOR_LIBRARY to identify content selection in CONTENT_LIBRARY that supports MOOD_TRANSITION

1370
MOOD_INDICATOR_LIBRARY indicates that
if PLAY_ROCK_ADVERTISEMENT is played now, 85% will listen to entire commercial
if GRATEFUL_DEAD_TOUCH_OF_GRAY is played now, 95% will listen to the entire commercial.
REIMBURSEMENT FROM ADVERTISER AT 85%=$.0025
REIMBURSEMENT FROM ADVERTISER AT 95%=$.005

1375
play GRATEFUL_DEAD_TOUCH_OF_GRAY

1380
Analyze Camera imagery
Camera indicates that ACTUAL_mood=(happy, intense, upbeat, ROCK)

1385
PLAY_ROCK_ADVERTISEMENT

1390
Analyze Camera imagery
Camera indicates that ACTUAL_mood=(happy, intense, upbeat, ROCK)
media player indicates that SCREEN_NAME listened to entire selection = Report for bonus
media player indicates that SCREEN_NAME clicked on advertisement= Report for bonus

FIG. 13C

PERSONALIZING CONTENT BASED ON MOOD

CROSS-REFERENCE TO RELATED APPLICATIONS

This application is a continuation-in-part of and claims priority to U.S. application Ser. No. 10/448,469, now abandoned, and U.S. application Ser. No. 10/448,316, now U.S. Pat. No. 7,243,104, entitled "Personalizing Content" and "Personalizing Content Using an Intermediary Bridge", respectively. Both applications were filed on May 30, 2003, and each is incorporated into the instant application by reference in its entirety.

TECHNICAL FIELD

Digital content may represent movies, music, slides, games and other forms of electronic content. With the maturation of local area and wide area networking technologies, digital content may be distributed on a wide variety of devices and a wide variety of formats.

BACKGROUND

Digital content is distributed on a wide variety of devices and in a wide variety of formats. The digital content may include movies, music, slides, games and other forms of electronic content.

SUMMARY

In one general sense, a computer program is configured to manage content accessed by a user by using a camera to capture an image of the user, analyzing the image to determine an actual mood for the user, identifying a desired mood state, comparing the actual mood to the desired mood state, and based on results of the comparison, selecting content for the user.

Implementations may include one or more of the following. For example, analyzing the image to determine the actual mood for the user may include analyzing one or more facial expressions for the user. Analyzing the facial expressions may include determining if a brow is furrowed to indicate an angry mood, an upset mood, or an intensity of a mood, determining if the brow is unfurrowed to indicate a neutral mood, a content mood, or a mood of lesser intensity, or analyzing a user's mouth features to determine if the user is smiling, frowning, angry, experiencing an intense mood, or experiencing a neutral mood.

Analyzing the facial expression may include identifying a change in a location of a facial feature, and using the change in the location to determine the actual mood. Analyzing the change in the location of the facial feature includes determining that a brow, a wrinkle, a dimple, a hairline, an ear, a nose, a mouth, or a chin is located in a different location. Analyzing the image to determine the actual mood may includes comparing current information related to a current image with previous information related to a previous image, identifying a differential describing how the current information differs from the previous information, and using the differential to determine the actual mood.

Analyzing the image to determine the actual mood may include identifying a level of user movement, and using the user movement to determine the mood. Identifying the level of user movement may include identifying a rhythmic motion, and using the user movement to determine the mood includes using the rhythmic motion to identify the actual mood.

It may be determined that selected content did not transition the user to the desired mood, and a user profile may be adjusted to reflect a variation between the predicted mood and the actual mood.

The user may be enrolled in a training regimen to determine a user profile for the user, and the user profile may be used to determine the actual mood for the user.

Enrolling the user in the training regimen may include associating one or more facial expressions of the user with one or more moods. Enrolling the user in the training regimen may include evaluating a user response to one or more selections of content. Evaluating the user response to the one or more selections of content may include generating perceivable output for a first content selection, presenting an image of the user captured in response to the generation of the perceivable output, and prompting the user to specify the actual mood as depicted in the image.

The user may be enabled to identify facial features indicative of the actual mood. Evaluating the user response to the one or more selections of content may include generating perceivable output for a first content selection, and prompting the user to specify the actual mood. Enrolling the user in the training regimen may include prompting the user to confirm that a mood determined by evaluating an image relates to an actual mood. Enrolling the user in the training regimen may include generating perceivable output from a content selection configured to test the user's response, using the image to evaluate a user's response, generating a mood model using the user's response, and selecting content using the mood model. The operations of generating additional perceivable output from the mood impulse content selection and using the image to evaluate the mood impulse response may be repeated to generate a comprehensive mood impulse response function such that additional mood information for different moods is gleaned.

In another general sense, a computer program may be configured to manage content accessed by a user by identifying an initial mood of a user, identify a mood destination for a user, using a mood-based playlisting system to select content to be made perceivable to the user to inspire a transition from the initial mood to inspire a transition from the initial mood to the mood destination, rendering the selected content to the user, using a camera to capture an image of the user reacting to perception of the content, analyzing the image to determine an actual mood for the user, comparing the mood destination to the actual mood, and based on results of the comparison, selecting content for the user.

Implementations may include the following or other features. For example, comparing the mood destination to the actual mood may include determining a different between the initial mood and the actual mood, and using the difference to determine content needed to inspire further transition to the mood destination.

In yet another general sense, a computer program may be configured to manage content accessed by a user by using a mood monitor to capture mood signals from the user, analyzing the mood signals to determine a mood for the user, and responsive to the mood, selecting content for the user.

Implementations may include the following or other features. For example, using the mood monitor to capture mood signals may include using an electrical signal monitor, a brain wave monitor, a brain imaging device, a microphone, an electromagnetic antenna, or an olfactory sensor to capture the mood signals.

Other features will be apparent from the description and drawings, and from the claims.

DESCRIPTION OF DRAWINGS

FIG. 1 is a block diagram of a communications system that enables electronic content to be distributed.

FIG. 2A is a graph of a mood spectrum that illustrates how a selection of content may be scored to quantify the mood in an automated manner.

FIG. 2B is a graph illustrating how a mood spectrum and scoring system may be used to associate content with an actual mood.

FIG. 6 is a flow chart showing how a playlist of content may be transitioned from a mood originating point to a mood destination using intermediate tracks.

FIG. 11 is an exemplary listing of variables illustrating how facial components may be used to generate a mood.

FIG. 12 is an exemplary user profile for a screen name that relates a component in a facial expression to a mood that may be used in a mood-based playlisting system.

DETAILED DESCRIPTION

Figure 2C:
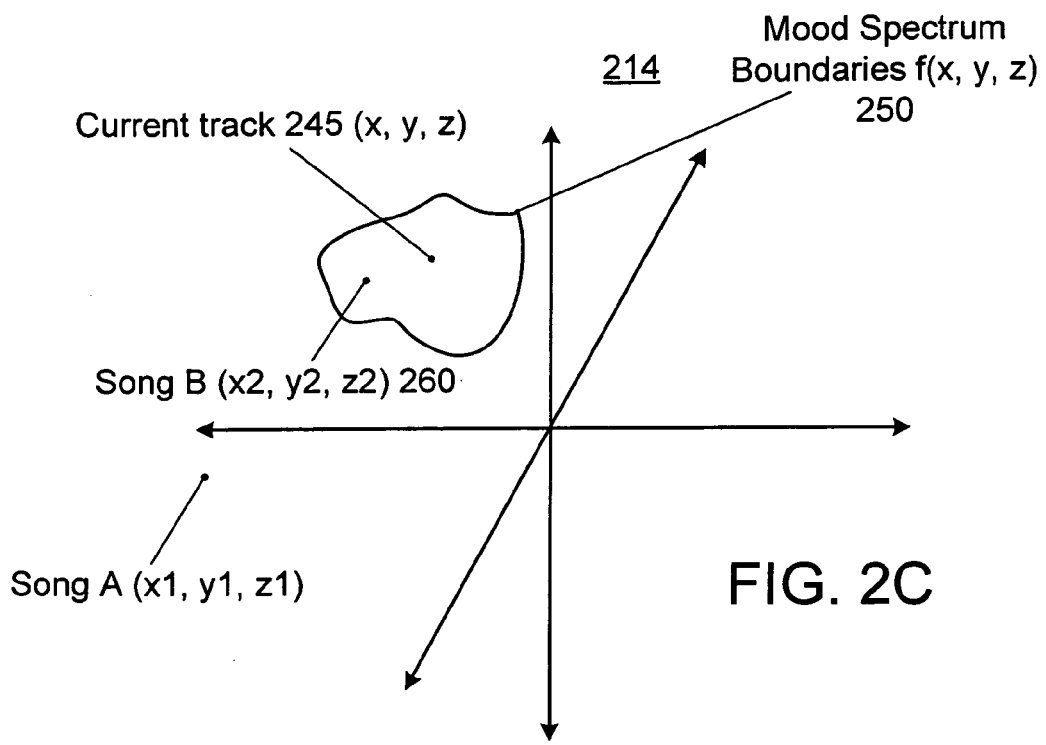
FIG. 2C is a graph illustrating a three-dimensional mood management system that illustrates how mood consistency may be maintained using three or more factors.

Digital content such as digitally encoded songs (e.g., MP3 and NSV files) and video may be accessed on a variety of platforms through a variety of distribution channels. Examples of the platforms include personal computers, specialized appliances (e.g., a compact digital audio player such as Apple's iPod™), home stereo systems, and other devices. Examples of the distribution channels include Internet radio and television stations, network-based on demand services, Internet and retail outlet purchasing, and promotional distribution (e.g., an optical disk provided in a magazine).

The plethora of digital content, distribution channels and content providers make it very easy for a user to identify and select a different content sources that are more responsive to the user's particular interest at a particular time. For instance, to select content responsive to the user's particular interest at a particular time, a user's mood or emotional zone may be mathematically modeled. A media player (e.g., a jukebox or an application on a personal computer) may be used to select content responsive to the determined mood. The mood-based playlisting system may be used to select or plan a sequence of tracks (e.g., a playlist) to achieve or preserve a desired mood-state for the user. A mood transition may be planned so that any mood change between different 'tracks' comports with a determined mood transition specification.

A mood state may be modeled using mood information for a content selection (e.g., a digitally-encoded song) and/or by using mood information determined by how a user is interacting with the media player. For example, a playlist engine on a host may determine that a particular song is associated with an uplifting mood, and correspondingly may select additional songs and advertisements consistent with the uplifting mood. However, a likelihood exists that an actual mood for a user may differ from the predicted mood for a user. For instance, a user may be listening to classical music as the user is frantically packing last-minute for a vacation. The output of classical music may indicate a relaxed mood for the predicted mood, but the actual mood may differ, as the user is anxious, stressed, and/or panicked with last-minute vacation preparations.

In order to increase the efficacy of a mood-based playlisting system, a mood sensor such as a camera may be used to provide mood information to the mood model. When the mood sensor includes a camera, a camera may be used to capture an image of the user. The image is analyzed to determine a mood for the user so that content may be selected responsive to the mood of the user.

For example, a user listens to an internet radio station. The user may initially select one of several Internet radio stations before settling on a 1980s-oriented station. The personal computer may include a desktop video camera that captures imagery of the user in front of the personal computer.

The 1980s-oriented station is flexibly configured to enable access to different content based on the mood of the user. Thus, if a user does not 'like' a first selection (e.g., WHAM's Wake Me Up), the user may advance to another selection, either explicitly (e.g., by selecting a next-track feature) or implicitly (e.g., by determining that the user is in a different mood). In particular, the media player or a host accessed by the media player may analyze imagery provided by the desktop video camera and determine a mood for the user. When the user's facial expression indicates disgust, anger, or upset moods, the media player may select different content, for example, by selecting a different track at the conclusion of the first selection, or by advancing to another song altogether in the middle of the song.

In one implementation, the Internet radio station places an advertisement responsive to a mood state, or controls the mood state of previous songs to place an advertisement. For example, no Internet radio station may precede a desired advertisement with a specified sequence of one or more content selections that foster the desired mood. A camera may be used to evaluate whether the desired or predicted mood along the preceding sequence represents an actual mood for the user. When the actual mood differs from the predicted mood, the media player may select a different track or sequence of tracks to foster the desired mood or selects a different advertisement.

FIG. 1 illustrates a media-based communications system 100 that may distribute content electronically. The media-based communications system 100 includes a content source 110, a network 120, and a player 130. Although the media-based communications system 100 is shown as a network-based system, the media-based playlisting system may access media files residing in a standalone device or in a different configuration. For example, a mobile jukebox may play content in the form of music encoded in a media file format.

The content source 110 generally includes one or more devices configured to distribute digital content. For example, as shown, the content source 110 includes a server 112 and a duplicating switch 114.

Typically, a content source 110 includes a collection or library of content for distribution. Alternatively, or in addition, the content source may convert a media source (e.g., a video or audio feed) into a first feed of data units for transmission across the network 120. The content source 110 may include a general-purpose computer having a central processor unit (CPU), and memory/storage devices that store data and various programs such as an operating system and one or more application programs. Other examples of a content source 110 include a workstation, a server 112, a special purpose device or component, a broadcast system, other equipment, or some combination thereof capable of responding to and executing instructions in a defined manner. The content source 110 also may include an input/output (I/O) device (e.g., video and audio input and conversion capability), and peripheral equipment such as a communications card or device (e.g., a modem or a network adapter) for exchanging data with the network 120.

The content source 110 includes playlisting software configured to manage the distribution of content. The playlisting software organizes or enables access to content by a user community. For example, the content source 110 may be operated by an Internet radio station that is supporting a user community by streaming an audio signal, and may arrange a sequence of songs accessed by the user community.

The playlisting software includes mood-based playlisting software that maintains a consistent mood in selecting content. Generally, the mood-based playlisting software selects content so that any related mood transition between different content components is acceptable.

The content source includes a duplicating switch 114. Generally, a duplicating switch 114 includes a device that performs network operations and functions in hardware (e.g., in a chip or part of chip). In some implementations, the duplicating switch may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip.

The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The network 120 may include hardware and/or software capable of enabling direct or indirect communications between the content source 110 and the player 130. As such, the network 120 may include a direct link between the content source and the player, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The player 130 may include one or more devices capable of accessing content on the content source 110. The player 130 may include a controller (not shown) that processes instructions received from or generated by a software application, a program, a piece of code, a device, a computer, a computer system, or a combination thereof, which independently or collectively direct operations of the player 130. The instructions may be embodied permanently or temporarily in any type of machine, component, equipment, storage medium, or propagated signal that is capable of being delivered to the player 130 or that may reside with the controller at player 130. Player 130 may include a general-purpose computer (e.g., a personal computer (PC) 132) capable of responding to and executing instructions in a defined manner, a workstation, a notebook computer, a PDA ("Personal Digital Assistant") 134, a wireless phone 136, a component, other equipment, or some combination of these items that is capable of responding to and executing instructions.

In one implementation, the player 130 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, player 130 may include a wireless telephone running a micro-browser application on a reduced operating system with general purpose and specialized hardware capable of operating in mobile environments.

The player 130 may include one or more media applications. For example, the player 130 may include a software application that enables the player 130 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The media application includes mood-based playlisting software. The mood-based playlisting software may work independently of, or in conjunction with, playlisting software residing on the content source 110. The mood-based playlisting software may mitigate the mood transition created when the content changes. In one example, the playlisting software permits the user to select from a recommended list of content that is consistent with the previous or present track. In another example, the mood-based playlist software may seamlessly manage the transition of content.

FIGS. 2A-2D describe a mood modeling system that may be used by the systems described with respect to FIG. 1. FIG. 2A illustrates a mood spectrum 200 that may be used to determine a mood consistency between a selection of content and planned future content. Mood spectrum 200 has been abstracted to be independent of the underlying mood, and has been normalized in the range from 0 to 10. In mood spectrum 200, the mood indicator 205 for the current track has a value of approximately 5 on the mood spectrum 200. The mood indicator 205 for the current track is related to the mood spectrum 210 consistent with the current track, which indicates mood values for content that may be selected consistent with the mood value for the current track under consideration. In one example, the playlist and content selection is being planned and the current track under consideration has not been distributed. In another example, the current track under consideration has been or is being distributed (e.g., across the Internet by an Internet radio station).

FIG. 2B illustrates a graph 220 how content may be categorized using one or more moods and specifically describes how the mood indicator associated with a particular piece of content may span multiple moods. As shown, the moods include "angry," "excitement," "dance," "romantic," "mellow," and "sad." FIG. 2B uses a 1-dimensional axis to categorize content along the mood spectrum 225. Specifically, the content in FIG. 2B spans two of the moods, specifically, dance and romance. Other dimensioning systems relating to more than two moods may be used. For example, an X dimensional system may gauge X moods across X axes. Nevertheless, regardless of the number of axes that are used, a selection of content may be related to various moods to identify future content that is consistent with the mood of the content that has been selected.

FIG. 2B includes a mood indicator 230 for the current track. The mood indicator 230 describes a particular mood rating for a piece of content that has been identified. The content that has been identified may include a selection of content that is actually being played or one that is destined for one or more users. Alternatively, the mood indicator for a current track may be used to create a user playlist to better identify desired content deemed compatible for a user. As is shown in FIG. 2B, the mood indicator 230 for the current track lies within the mood spectrum 225 consistent with the current track. This mood spectrum 225 indicates that content that falls within dance and romantic themes is deemed consistent with the mood indicator for the current track.

In one implementation, the consistency with the current track and the identification of a particular mood spectrum may be determined by scoring the current track and a proposed next track and determining the relationship between the score for the current track and the score for the proposed next track. Alternatively, a selection of content may be associated with one or more discrete values that describe the content. For example, a song may be associated with letters, each of which describes one or more themes that may be used to characterize the song. Thus, as is shown in FIG. 2B, if D and R were used to identify, respectively, dance and romantic themes, a record describing the current track could have a D and a R in its record/metadata.

Referring to FIG. 2C, a three-dimensional mood management graph 240 is shown that illustrates how mood spectrum consistency may be determined across three factors, influences, or moods. Specifically, the three-dimensional coordinate system for the current track 245 is shown within a three-dimensional volume describing the mood spectrum boundary 250 as a function of three coordinates. Also shown is a first song 255 that does not fall within the volume of the mood spectrum boundaries 250 and a second song 260 that lies within the mood spectrum boundary 255. Thus, when content is being selected, if the mood spectrum boundary 250 is being used as the determining criteria, song 255 may be excluded as it lies outside the mood spectrum boundary 250, while song 260 may be included in the playlist as it lies within the mood spectrum boundary 250.

Depending on the implementation and the configuration, the mood spectrum boundary may represent a simpler function such as a cone or a sphere. For example, a sphere may be used to identify equidistant points that fall within a certain mood range of the current track. However, the mood spectrum boundary 250 need not include a simple function. For example, if detailed analytics are used to measure mood spectrum consistency and user response, a more detailed and non-symmetrical volume may be used to measure the mood spectrum boundary 250. One illustration of this may include content that may be very consistent across one axis for multiple themes, but inconsistent with minor changes across a different axis in mood spectrum. For example, if the content is being scored across lyrics, tempo and intensity, lyrics that may contain age-appropriate suggestions may only be consistent with content that is similarly appropriate for the identified age. In contrast, content that features a slower tempo may be consistent with music across multiple themes with a similar tempo. Accordingly, the function that describes the mood spectrum boundary 250 of the current track 240 may incorporate analytics that permit a small tolerable deviation in the lyrical deviation while also permitting a wider variation in the tempo axis.

Figure 2D:
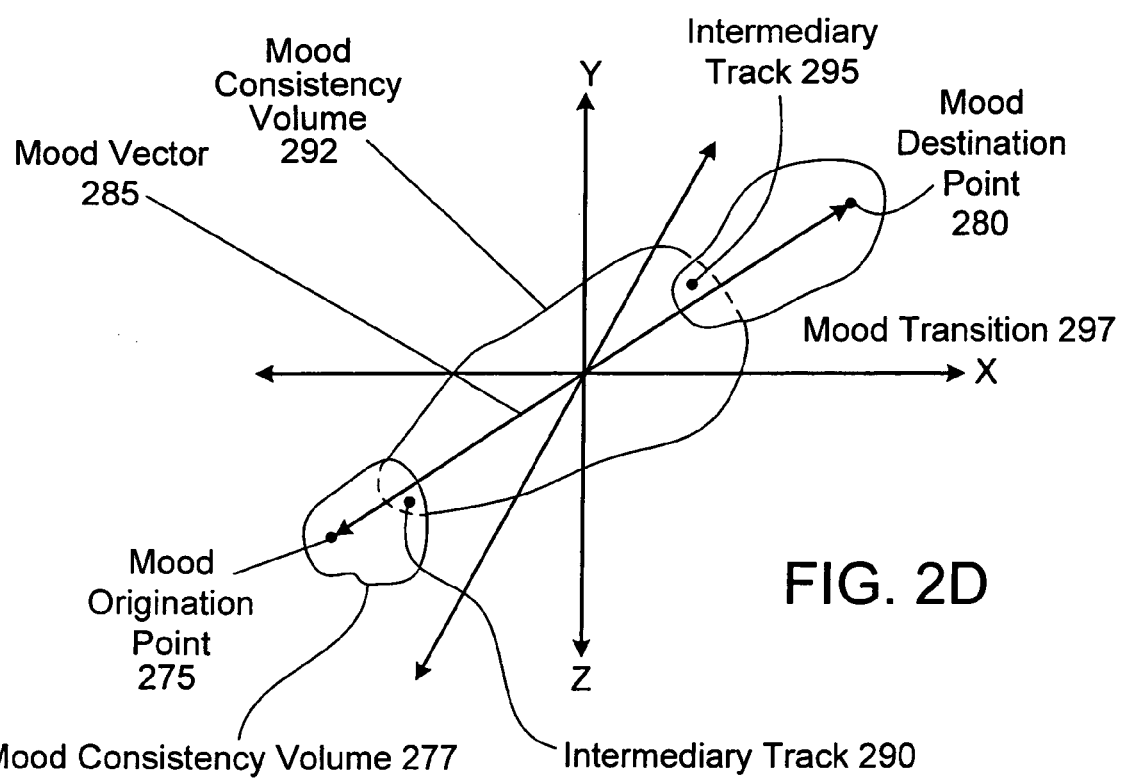
FIG. 2D is a graph illustrating how mood transitions may incorporate intermediate tracks to create a more successful transition in reaching a mood destination.

FIG. 2D illustrates a graph of a three-dimensional mood consistency scoring system 270 that illustrates how mood transitions may be planned so that the mood may be changed from a current mood originating point to a mood destination. The transitions may be structured such that a transition directly from a mood originating point to a mood destination that otherwise appears difficult or unsuccessful may be made more successful by using one or more intermediate transitions. Thus, the likelihood of a successful transition between the mood originating point and the mood destination point is increased.

Mood scoring system 270 illustrates a mood originating point 275 and a mood destination 280. The general mood transition that is required is illustrated by the vector 285 from the mood originating point 275 to the mood destination point 280. However, the mood consistency volume 277 for mood originating point 275 does not include the mood destination point 280. Accordingly, one or more intermediary tracks may be used to successfully transition one or more users to the mood destination point.

To accomplish this transition, intermediary track 290 is used as the next content selection to create a mood that is closer to the mood destination point 280, even though the consistency volume 292 for the intermediary track 290 does not actually reach or include the mood destination 280. After the intermediary track 290 is selected, a second intermediary track 295 is added to the playlist to move the current mood indicator closer to the mood destination 280. As is shown in FIG. 2D, the intermediary tracks 290 and 295 both lie within the same transition volume 292, thus preserving a consistent mood transition from the intermediary track 290 to the intermediary track 295. From the intermediary track 295, the system may transition directly to the mood destination point 280 and preserve the consistent mood as both the intermediary track 295 and the mood destination point 280 lie within the mood transition volume 297.

Although the transition from the mood originating point 275 to the mood destination point 280 features the use of two intermediary tracks, the implementation of a successful transition need not be limited to the two intermediary tracks that are shown. For example, depending on the configuration, no intermediary tracks may be required to successfully transition from the mood originating point 275 to the mood destination point 280. Alternatively, one, two, three, or more intermediary tracks may be used to successfully transition from the mood originating point 275 to the mood destination point 280.

The intermediary tracks need not resemble similar forms of content. For example, the mood originating point for the current track may include a song that is being transmitted, a first intermediary track may include a commercial, a second intermediary track may include a second song, and the mood destination point may relate to a planned advertisement that has been targeted for increased chances of success.

Also, the volumes that describe the mood consistency may be configured to reflect probabilistic chances of success and may change, based on the desired chance of success. For example, the mood consistency volume 277 may be planned on a model of mood consistency such that transitioning from the mood originating point 275 to the intermediary track 290 will preserve 90% of the audience upon that transition. Alternatively, if fewer intermediary tracks are desired, a larger mood consistency volume that covers more distance may be used based upon a modeled probability of 50%. Thus, in this model, fewer intermediary tracks may be required to reach the mood destination point.

Finally, the transitions that are shown may include real-time feedback to better predict the actual user response to be transitioned. For example, a test audience may be sent the intermediary track in advance of the larger audience. If the response of the test audience indicates that the transition is not as successful as was expected, an alternate path may be plotted to increase the chance that the transition will preserve the audience. For example, an intermediary track may be chosen that lies closer to the mood originating point. Another example of an alternative path that may be chosen includes a trusted transition that has been used previously and is associated with what is believed to be a higher success rate in transitioning.

Figure 3:
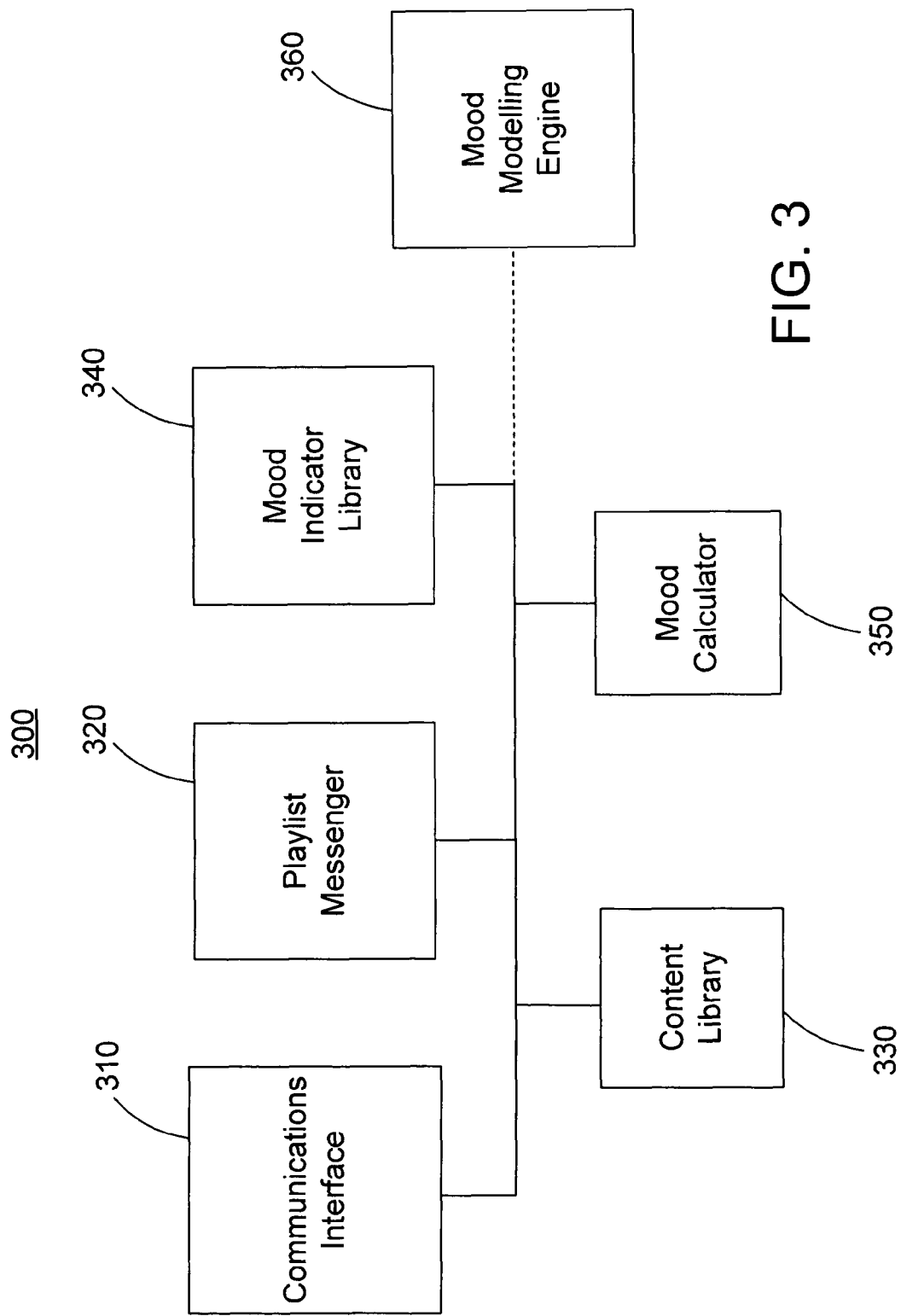
FIG. 3 is a block diagram of a mood-based playlisting system.

FIG. 3 illustrates a mood-based playlisting system 300 that may be used to generate a playlist with consistent moods between two or more selections. The mood-based playlisting system 300 includes a communications interface 310, a playlist manager 320, a content library 330, a mood indicator library 340, a mood calculator 350, and an optional mood-modeling engine 360. Generally, the mood base playlisting system 300 manages the playlist for one or more pieces of content to be transmitted to an audience. The communications interface 310 receives data describing the audience and one or more content goals to be incorporated, so that the playlist manager 320 may put together a playlist of selections from the content library 330 by using the mood indicator library 340 to determine a score for the content and maintaining consistency between the selected content using the mood calculator 350.

The communications interface 310 may be used to exchange data describing the audience that is being managed and/or to distribute playlist information. The communication interface 310 also may be used to receive updates to the content library 330, the mood indicator library 340, and different algorithms and models used by the mood calculator 350.

The communications interface 310 receives updates from one or more partners or other devices to exchange content for incorporation into a playlist. For example, a newly-released song may be distributed, along with advertisements for incorporation into the playlist. Similarly, mood indicator information related to the content and/or advertising to be distributed also may be received by the communications interface 310 for transmission to the mood indicator library 340. Audience data associated with content may be modeled, described electronically, and transmitted to the mood calculator 350 to better select content to be incorporated into the playlist. The playlist manager 320 includes a code segment that identifies content to be used in a playlist. For example, the playlist manager 320 may generate a playlist that describes a piece of content to be accessed and reference information so that the content may be accessed using the reference information.

Alternatively, the playlist manager 320 may generate a playlist to be used by a distribution point. For example, an Internet-based radio system may receive the playlist from the playlist manager for transmission to the listening audience. Depending on the configuration of the mood-based playlisting system and whether the mood-based playlisting system is determining the playlist and distributing the content, the playlist manager 320 also may transmit the content to be used in the playlist (e.g., through communications interface 310).

The content library 330 may include one or more selections of content for incorporation into a transmission for a receiving audience. Depending on the nature of the content, the content library may be adjusted to accommodate the particular media and/or audio demands. For example, the content library may include digitally encoded songs and related music videos for broadband users. The content library also may include metadata that describes the content. In the case of songs, the metadata may include, for example, artist, album, and track information. When the content library includes video information, the video information may include different bit rates for different audiences. Thus, a user with a high bandwidth connection may be able to access a selection encoded for a higher bit rate and having relatively higher quality, while a user with a slower connection may be able to access the same content encoded using a lower bit rate and having relatively lower quality. The content library and the metadata in the content library also may be associated with one or more rules that may be used in the content selection. Thus, a particular selection of content in the content library may have detailed licensing information that governs how the selection of content may be accessed. For example, a particular selection of content may be available for promotional purposes during a limited time and may be unavailable thereafter. Other examples of restrictions that may be incorporated in the content library include ASCAP licensing restrictions that control the number of times a selection or content may be accessed in a particular period, and preclude a selection of content from being accessed in a particular manner. For example, a selection of content may be precluded from being incorporated in a playlist twice in a row.

The mood indicator library 340 may include one or more values designed to describe the mood for a selection of content. Depending on the configuration of the mood-based playlisting system, different metrics may be stored in the mood indicator library 340. Thus, one example of the value stored in the mood indicator library may describe a selection of content and a mood indicator that scores the content in a specified numerical range. Another metric may include different values that indicate whether a selection of content is compatible with a chosen theme or genre.

Although the mood-based playlisting system has been described as maintaining consistency within a desired mood for a selection of content, other non-mood-based elements may be modeled and incorporated into the content selection process and stored in the mood indicator library. For example, a user pool may be divided into premium and non-premium communities. The premium community may be allowed to access exclusive content that is not available to the non-premium community. This premium status for content that may be available may be stored in the mood indicator library. Other non-mood-based metrics may be used.

For example, the mood indicator library 340 may include advertising effectiveness data. Examples advertising effectiveness data may include, but are not limited to, an indication of which advertisements should be used with specified moods, the effect of using an advertisement with the different moods, projected and past advertisement efficacy (both retaining a user and receiving a response) for both a user and a demographic, and reimbursement.

The mood indicator library 340 may be configured to incorporate feedback based on a user or a community of user's response to content. For example, the actual response by users to content may be tracked so that efficacy data may be updated to reflect the users' actual responses. While a original data set may be used to predict a mood, the users' prior actions may be used in generating and consulting a mood model that more accurately predicts the users' response. Old rules that are not accurate may be replaced by new rules determined to be more accurate. The new rules may be used to generate future playlists and/or select content in the future for the user.

The mood calculator 350 may be used to receive values describing a current playlist, access the mood indicator library 340, and assist the playlist manager 320 in generating the playlist. Depending on the configuration of the playlist manager 320, the structure of the mood calculator 350 may differ. For example, in one configuration, the playlist manager 320 may suggest a particular piece of content and poll the mood calculator 350 to determine if the selection of content is appropriate and consistent with the current mood. The mood calculator then may respond with an indicator of whether the suggested content is consistent.

Alternatively, the playlist manager 320 may provide an indicator of a current track that is being transmitted and may poll the mood calculator 350 for a suggested piece of content. In response, the mood calculator 350 may poll the mood indicator library 340 to retrieve a consistent piece of content. The mood calculator 350 then may transmit the identity of the consistent content to the playlist manager 320, which may retrieve the content from the content library 330.

As an optional element, the mood-based playlisting system 300 may include a mood-modeling engine 360. For example, as content is being added to the content library 330, the mood-based playlisting system 300 may interface with the mood-modeling engine 360 to determine and gauge the mood spectrum for the newly-added content. The mood-modeling engine 360 may use the communications interface 310 to develop an appropriate mood analytic for the newly added content. For example, the selected content may be sent to a testing code segment to determine an anticipated user response. Alternatively, the mood-modeling engine 360 may interface with the playlist manager to add the proposed content to a test group of listeners to gauge their response to the selected content.

Other analytics that may be used by the mood-modeling engine 360 may include content analysis that may evaluate lyrics, the tempo, or other elements relating to the content. In one example, the tempo for a newly-received piece of content may be "scored" using a frequency analyzer to determine the theme and mood with which the content is consistent.

Although the mood-based playlisting system 300 is shown as an interconnected group of sub-systems, the configuration of the mood-based playlisting system 300 may include elements that have allocated the functionality in a different manner. For example, the content library 330 may be co-located or merged with the mood indicator library 340. Thus, the mood indicator for a selection of content may be stored as an element of metadata residing with the content record. Alternatively, the elements described in mood-based playlisting system 300 may reside in a larger code segment with constituent code segments described by the elements shown in FIG. 3.

Figure 4:
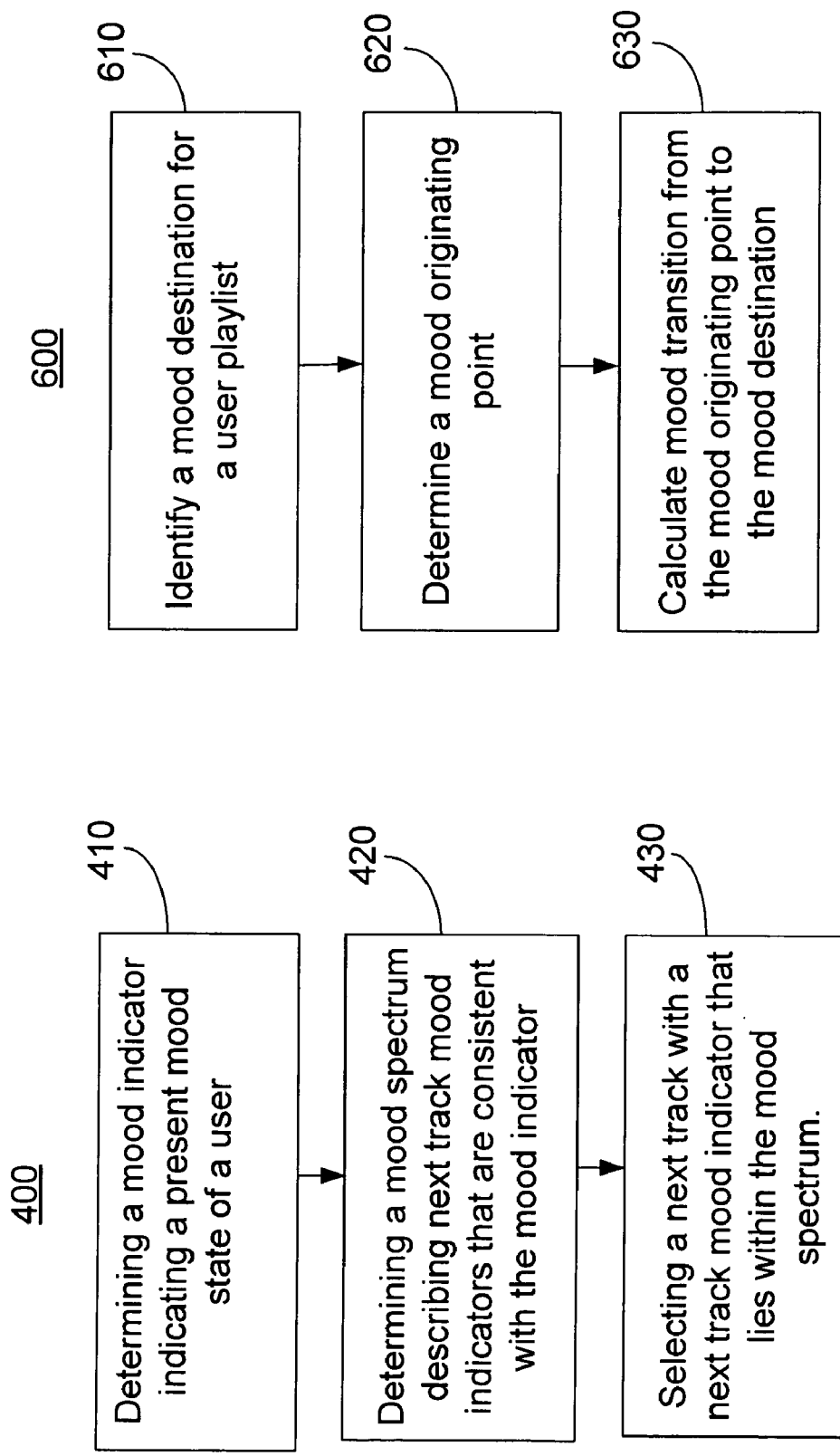
FIG. 4 is a flow chart showing how mood consistency may be maintained between two tracks.

FIG. 4 is a flow chart 400 that illustrates how a track of content may be selected in a way that maintains mood consistency. Specifically, the flow chart 400 may be implemented using the mood-based playlisting system such as was described previously. In general, a mood-based playlisting system determines a mood indicator that indicates a present mood state of a user (step 410), determines a mood indicator describing a next track mood spectrum that is consistent with the mood indicator for the current track (step 420) and selects a next track that lies within the next track spectrum for the current track (step 430).

Initially, the mood-based playlisting system determines a mood indicator that indicates a present mood state of a user (step 410). Typically, this will include creating a score that describes the track of content under analysis. For example, a song being distributed on the radio could be given a score from 0 to 10. In a multi-dimensional scoring system, the mood indicator could include a multi-dimensional coordinate that describes the mood indicator with regard to several variables.

The mood indicator may be determined in advance of distributing the track. For example, the system may assemble a user playlist with a sequence of tracks for distribution. This sequence may be distributed to distribution nodes (e.g., local radio stations or regional Internet servers). Alternatively, the mood indicator may be determined for a track that is being or has been distributed. For example, the mood indicator may be determined for a song that is being played over the airwaves.

A mood spectrum may be determined for the track for which a mood indicator has just been determined (step 420). The mood spectrum may be used to select the next track such that the next track lies within the boundaries of the mood spectrum. As has been described previously, the mood spectrum may include multiple variables and may relate to a likelihood of success that a user may stay with the current distribution (e.g., the same channel) upon the playing of the next content selection.

With the mood indicator and the mood spectrum for the current track determined, a next track is selected that lies within the mood spectrum (step 430). In one implementation, the next track may be selected by finding the track that is closest to the current track. For example, if the current track has a score of 5.17, the next closest track that may be selected may have a score of 5.18.

Alternatively, a content programmer may wish to have some variation within a mood spectrum, and the selection criteria may include a requirement that the next song differ by more than a specified variation threshold while still being within the specified mood spectrum. In the previous example, the content could be selected to be at least 0.5 units away from the current selection of 5.17 but still lies within the variation describing the mood spectrum of 1.0.

Within the range of values that are acceptable, the content may be selected randomly or the content may be selected based on identifying content that matches the criteria (e.g., is the furthest or closest away within the spectrum). If there is not a track that lies within the mood spectrum, the mood-based playlisting system 300 may alter its configuration to generate a selection of content. For example, the mood spectrum may be expanded so that more content lies within the mood spectrum. This may be accomplished by, for example, decreasing the threshold percentage of a success that is required in the transition or increasing the values that define the threshold for success. For example, if the mood spectrum only covered 70's rock, the mood spectrum may be expanded to include 70's and 80's rock.

Figure 5:
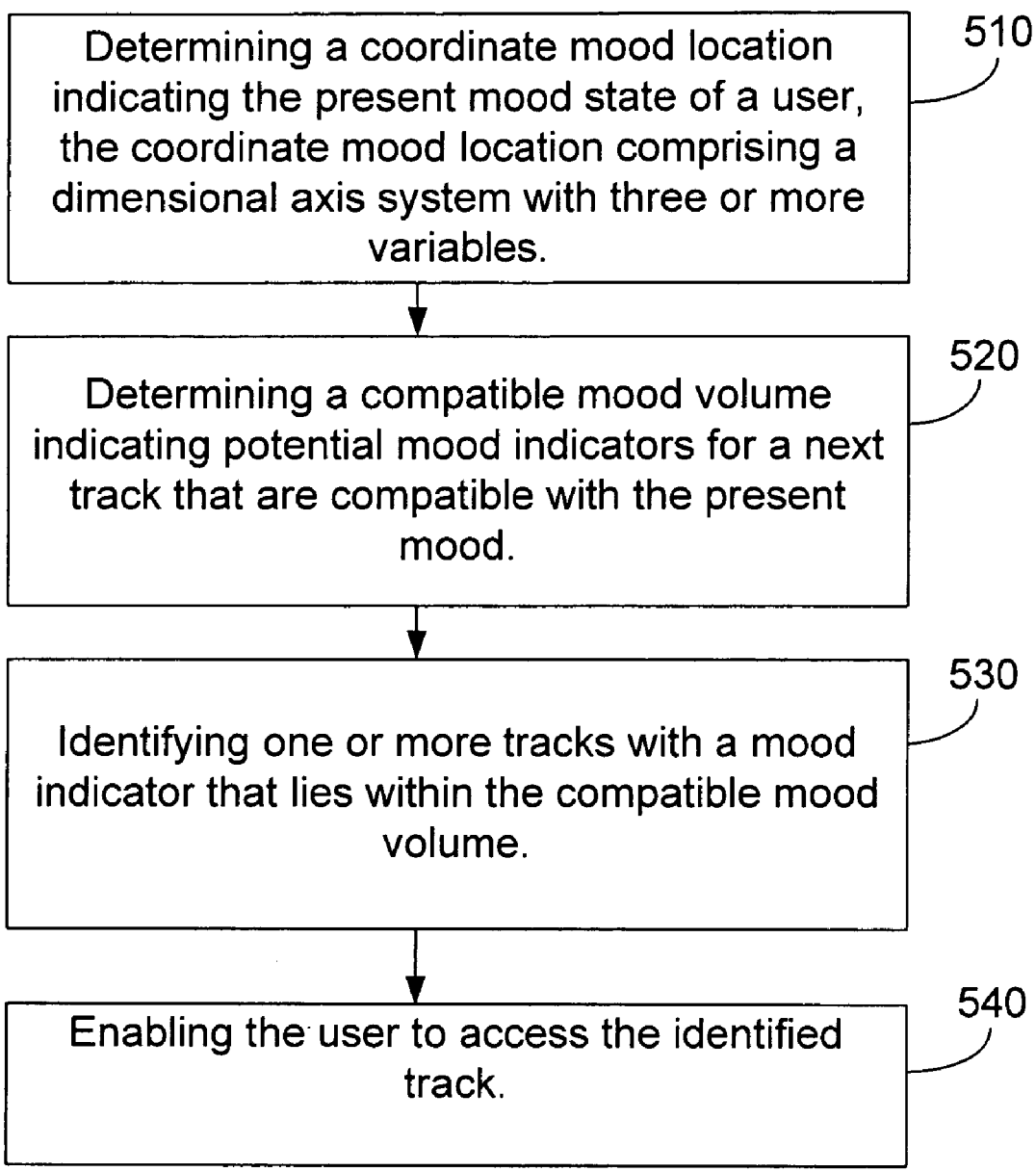
FIG. 5 is a flow chart showing how mood consistency may be maintained using a three-dimensional model to determine mood consistency.

FIG. 5 illustrates a flow chart 500 showing a mood-based playlisting system that incorporates a three-dimensional mood-based modeling system. In general, the three-dimensional mood-based playlisting system operates by determining a coordinate mood location for a current track that is being played. This may include or be described as the present mood state of a user. With the coordinate mood location determined, a compatible mood volume may be determined that describes future content selections that are deemed consistent with the present mood state. With the compatible mood volume identified, one or more tracks that lie within the compatible mood volume may be identified and a user may be able to access the identified tracks.

Initially, a coordinate mood location that indicates the present mood state of a content selection is determined (step 510). For example, the mood state may be described on X, Y and Z axes. In one example, the coordinate mood location is described in the context of the content that is being distributed. For example, the mood coordinates may measure the songs lyrics, tempo, and/or style. Alternatively, the coordinate mood location may also measure or describe the mood of the audience. For example, a particular song may be associated with a human emotion such as sadness, joy, excitement, or happiness. These human emotions may be measured independent of the underlying theme of the music. For example, some music whose theme is described as "golden oldies" may be associated with sadness while other music may be associated with joy.

With the coordinate mood location determined, a compatible mood volume describing compatible and consistent future content may be determined (step 520). For example, a sphere around a coordinate mood location may be identified that describes content compatible with the present track. With the compatible mood volume described, one or more tracks that lie within the mood volume may be identified (step 530). With the track identified, a user may be enabled to access the identified track (step 540).

In FIG. 6, flow chart 600 illustrates how an audience may be transitioned from an originating piece of content to a destination piece of content. This may be used, for example, to transition a user from a particular piece of programming (i.e., the originating content) to a targeted advertisement (i.e., the destination content) by tailoring the transitions from the originating content to the destination content. Accordingly, the likelihood of success and the effectiveness of the transition may be pursued.

Generally, the operations described in flow chart 600 may be performed using the systems and models described with respect to FIGS. 1-3. For example, the mood-based playlisting system 300 may be used to generate the playlist that transitions the user from the originating piece of content to the destination. Similarly, the transition and intermediate tracks described in FIG. 2D may be used to increase the effectiveness of the transitions. However, depending on the characteristics of the originating and destination content, the selection of the mood-based transition path may differ.

Generally, a mood-based playlisting system identifies a mood destination for a user playlist. A mood originating point is determined. With the originating point and destination paths known, a mood transition may be calculated from the mood originating point to the mood destination.

Initially, a mood destination for a user playlist is identified (step 610). Generally, identifying a mood destination includes identifying a selection of content to be included in the user playlist. For example, a distributor may wish to place a certain advertisement. Alternatively, a system administrator may wish to have an optimal lead-in for a particular piece of programming for the purpose of, for example, achieving optimal ratings for network content. This content to be inserted in the user playlist has an associated mood that relates to the content being distributed. In yet another example, a system administrator for a mood-based playlisting system may wish to have an optimal lead-in to increase the effectiveness and response of the audience to identified content that is to be transmitted in the future.

Separately or in parallel, a mood originating point may be determined (step 620). Determining a mood originating point may include identifying content that is being distributed or will be distributed to an audience prior to the transmission of the content associated with the mood destination. A mood originating point may be determined for the content that is being distributed. If the mood originating point differs from the mood destination of the content being transmitted (or to be transmitted), the resulting differential may create a mood transition that may create a less responsive result due to differences in the moods of the particular content. The mood transition from the mood originating point to the mood destination is calculated (step 630). Depending on the variation between the mood destination and the mood originating point, the transition may include one or more intermediary tracks. The intermediary tracks may be selected so that the mood metric for the intermediary tracks lies within the mood-consistency spectrum or volume of the previous track. Using the previous content or track as a baseline, the next content or track may be selected to minimize the number of intermediary tracks between the originating content and the destination content.

Figure 7:
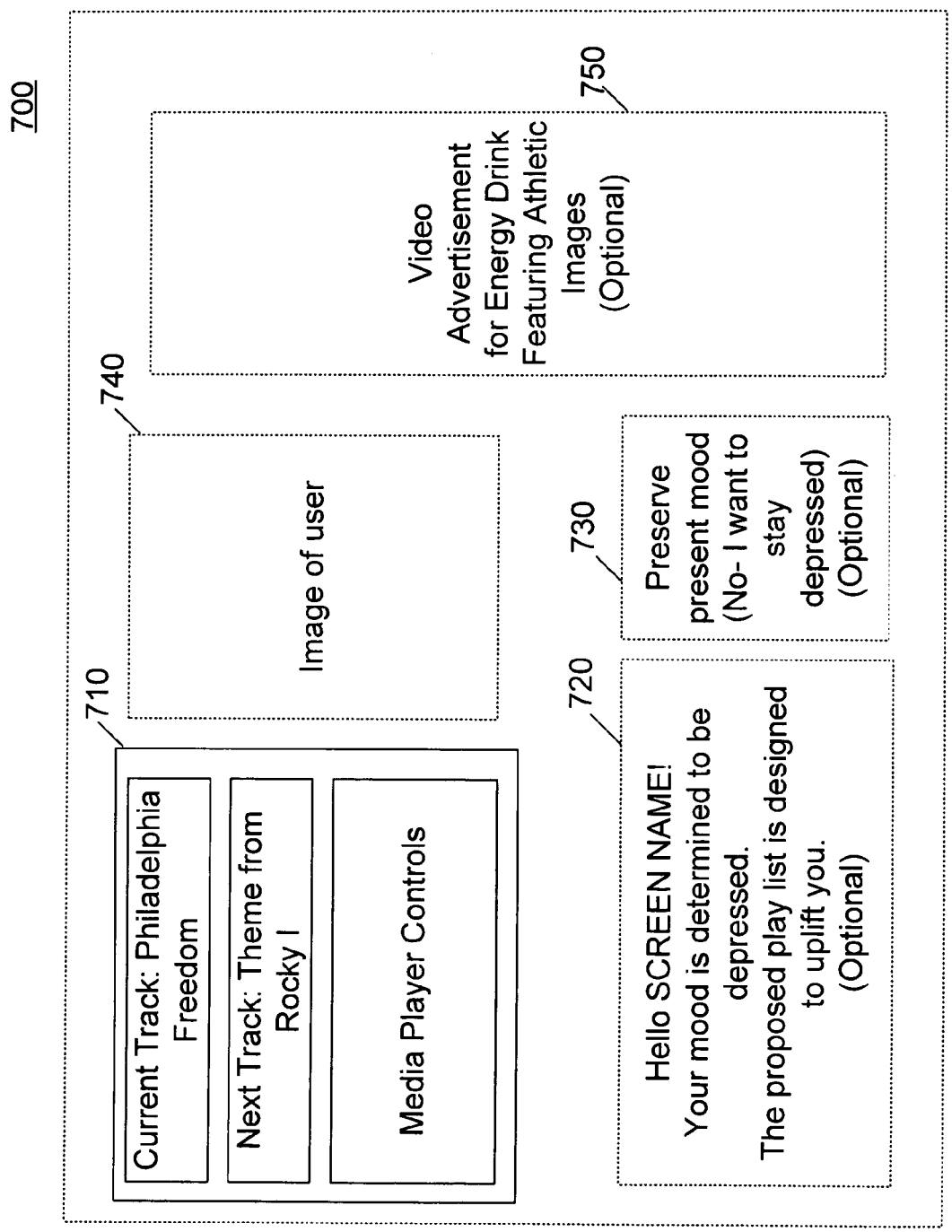
FIG. 7 is an exemplary graphical user interface (GUI) that may be presented to a user accessing a mood-based playlisting system.

FIG. 7 is an exemplary GUI 700 that may be presented to a user accessing a mood-based playlisting system. For convenience, particular components and messaging formats described earlier are referenced as performing the process. However, similar methodologies may be applied in other implementations where different components are used to define the structure of the system, or where the functionality is distributed differently among the components shown.

GUI 700 includes track and media player controls 710, a mood indicator 720, a mood preservation control 730, a mood correction control 740, and an advertisement display 750.

The track and media player controls 710 display the current and next tracks, and enable the user to control a media player (e.g., volume controls, rewind or fast forward, advance to a next track). Track and media player controls 710 indicate that the current track is Elton John's Philadelphia Freedom and the next track is the "Theme from Rocky."

The optional mood indicator 720 features a display that informs a user as to their mood state/status as determined by with respect to a mood-based playlisting system. The mood indicator 720 greets the user by screen name ("Hello SCREEN_NAME"), indicates the mood state (in this case that the user is determined to be depressed), and also indicates the mood destination (that the proposed playlist is designed to uplift the user). The screen name may be used to personalize the mood-based playlisting system to a user's identity. For example, a furrowed brow for a first user may be associated with an upset mood while a similarly furrowed brow for a second user may be associated with a neutral or even pleased mood. Although the analysis of moods or facial expressions may be personalized, a mood-based playlisting system may use normative analysis that is believed to be valid for large portions of the population. The normative analysis may be enhanced by analyzing multiple portions of a facial expression so that uncommon facial expressions/moods may be accounted for.

The optional mood preservation control 730 enables a user to preserve a present mood. In the example shown, the user may click on a "I want to stay depressed" button to select content consistent with the depressed mood.

The mood correction control 740 enables a user to specify that their actual mood is different from a mood that has been attributed to them. For example, if a user is actually happy while listening to the current track ("Philadelphia Freedom"), the user may access a drop down menu (not shown) and indicate their actual mood, which in this case is happy. As shown, the mood correction control 740 renders an image of the user.

Activating the mood correction controls may enable a user to identify, select, or highlight one or more features in a facial expression. For example, in response to activating a drop down menu to indicate the user is happy, the media player may present the image (e.g., in mood connection control 740) and ask the user to select one or more features associated with a happy mood. The user then may interact with the image and select a facial structure, such as a brow or smile, to indicate that detection of the selected facial structure reveals a particular mood. The indicated facial structure then may be stored and used in future analysis to identify a user's mood.

An optional image may appear in mood correction control 740 enabling a user to perceive a visual display. Presenting the visual display may be used in training the mood-based playlisting system to be responsive to the actual mood of the user, or to illustrate to a user whether one or more moods (e.g., a predicted mood) represents an actual mood.

The optional advertisement display 750 is used to present an image, or an audio/video clip. In the example shown, the optional advertisement display 750 features a video advertisement for an energy drink with athletic images. In one implementation, the video clip is played while the audio content selection is playing. In another example, the video clip is played upon the completion of the audio selection. Note that the advertisement may be coupled to the mood, as indicated in GUI 700 where an athletic advertisement is linked to an uplifting mood.

Figure 8:
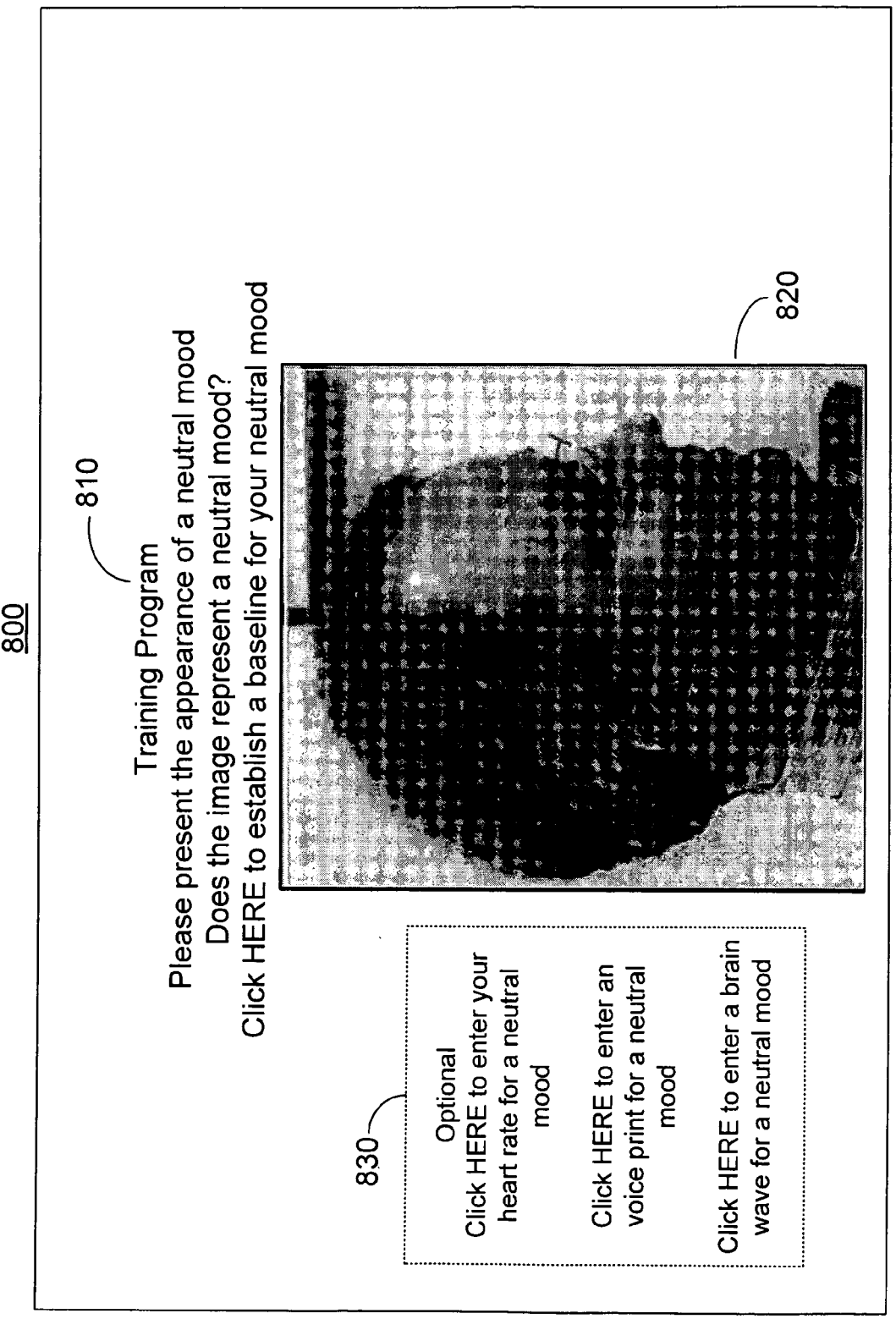
FIGS. 8-10 illustrate exemplary GUIs that may be presented to a user in training a mood recognition engine used in a mood-based playlisting system.
Figure 9:
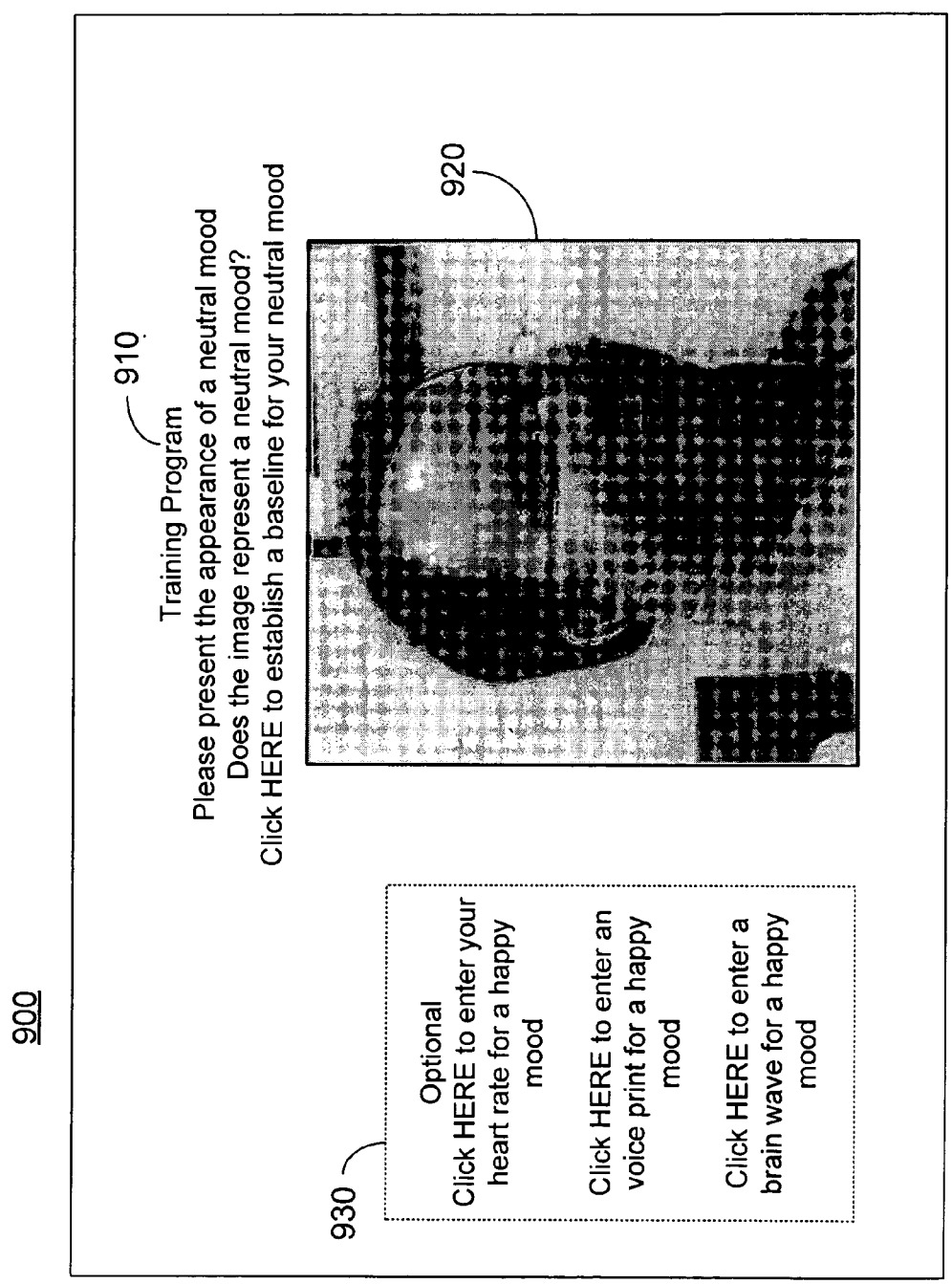
Figure 10:
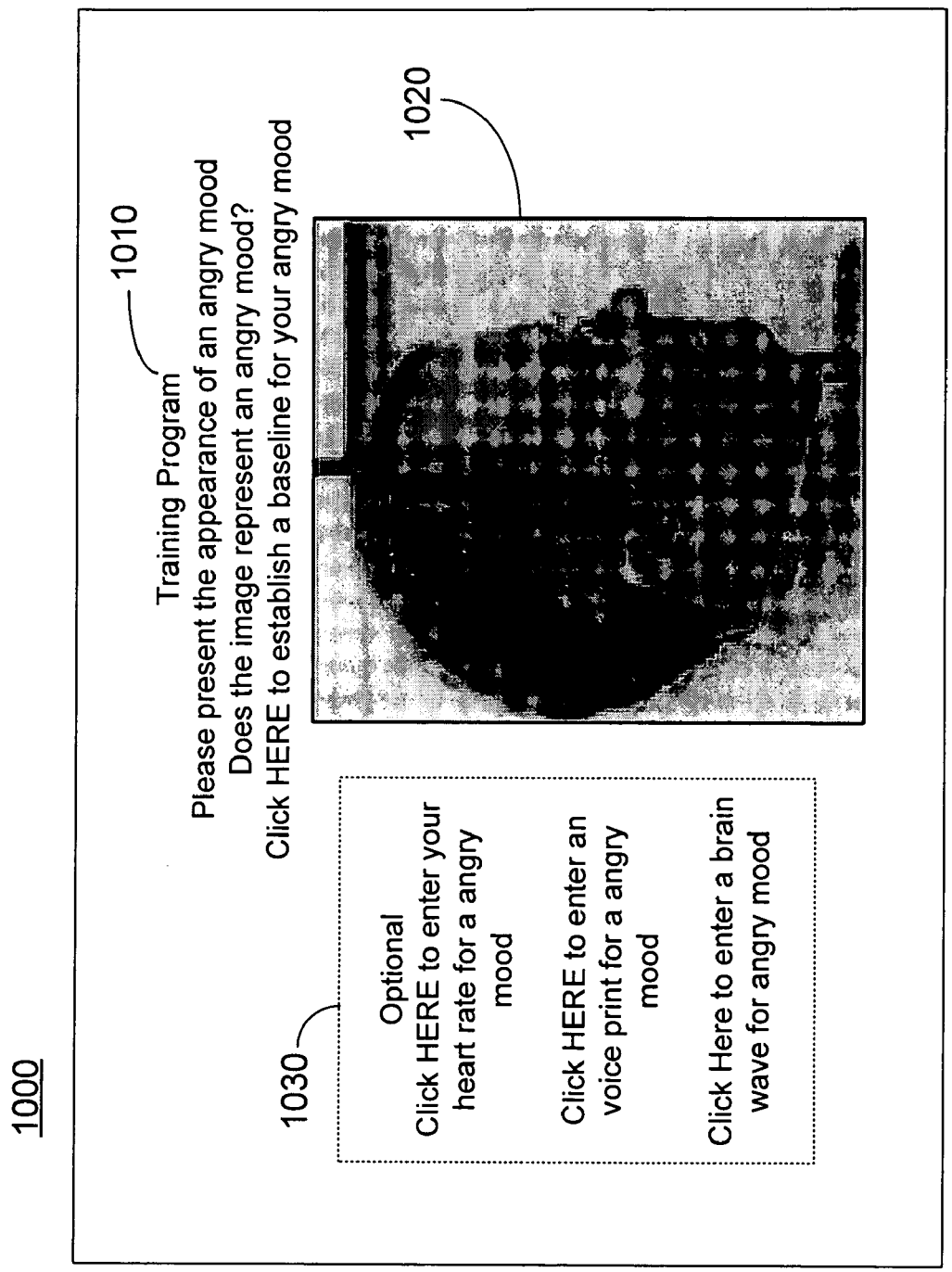

FIGS. 8-10 illustrate exemplary GUIs 800, 900, and 1000 that may be presented to a user while in training a mood recognition engine used in a mood-based playlisting system.

Although mood recognition engine may be able to adequately recognize a mood for a particular user, a training program may be used to make the mood recognition engine more accurate, account for a nonstandard facial expression/mood indication, and/or to identify which components in a facial expression should be used to determine a mood state. Generally, the exemplary training program shown in GUIs 800, 900, and 1000 prompts a user to present a neutral, happy, and angry mood, as specified by mood prompter 810, 910, and 1010, respectively. Feedback displays 820, 920, and 1020 present an image of the user rendering the desired mood. In feedback display 820, a user's neutral mood may be determined by detecting that (1) the brow structure and lips are parallel to the user's shoulder plane of the (parallel to the horizon); (2) the lack of wrinkles around the mouth; (3) the neutral position of the eyelid; and (4) the lack of tension present in the cheeks. In contrast, feedback display 920 illustrates how the presence of the user's happy mood may be determined by detecting (1) the presence of teeth, elliptical structure of the mouth, and pronounced angular structure between the mouth and the nose indicate a smile, and thus, a happy mood state; (2) the eyelids are retracted; and (3) the brow structure is curved around the eye. Finally, feedback display 1020 illustrates how the presence of the user's angry mood may be determined by detecting (1) the declining dip at the peripheral of the mouth; (2) the tension of muscles in the forehead and the cheek; (3) the orientation of the eyelid over the eye; and (4) the downward structure of the interior portion of the brow over the nose. Note that FIGS. 8-10 illustrate how both frontal and portrait (from the side) images may be used to determine the actual mood.

The pronouncement of the features used to identify a mood may vary between users. For example, in some users, anger may not be determined unless pronounced wrinkles are detected in the forehead, while in other users (e.g., the user shown in FIG. 10) minimal tension may be used to determine anger. Also, FIGS. 9 and 10 illustrate that even when a common feature is present in more than one mood (e.g., the presence of the pronounced angular structure between the peripheral of the mouth and the nose), other facial features may be used to infer mood. In response to viewing the feedback display, a user may alter a facial expression to present a mood likely to be responsive and/or likely to resemble an actual mood.

The user may provide additional mood determination information using alternate sensor gateways 830, 930, and 1030. The alternate sensor gateway allows a user to enter a heart rate, voice print and/or brain wave during the mood training process so that the heart rate, voice print, and brain wave metrics may be used in the future to better determine a mood.

Although FIGS. 8-10 described a user actively training a mood recognition engine, a mood-based playlisting system may use passive training techniques and/or more subtle training techniques. To illustrate a passive training system, a mood-based playlisting system may play a content selection, and analyze the responsive facial expressions as a baseline indicative of a particular mood. In a slightly more active training system, a content selection is played without asking the user to present a particular expression during which an image of the user is captured. In response to the content selection, and/or perceiving their image, the user is prompted to indicate a mood during the content selection. The mood-based playlisting system then may ask the user if the image is indicative of the mood provided by the user. Moreover, if the image is not indicative of expressed mood, the user may advance through a series of images captured during the rendering of the content selection to identify an image associated with the indicated mood. Another example used separately or addition to previously described examples allows a user to identify one or more components in a facial expression indicative of the desired mood (e.g., by allowing the user to highlight a brow structure, a lip structure such as a smile, or an existence of wrinkles in a particular portion).

FIG. 11 is an exemplary listing of variables 1100 illustrating how facial components may be used to generate a mood. Although listing 1100 relates to an exemplary configuration variables, the listing 1100 also may be presented in a GUI enabling a user to identify which components may be used in a mood-based playlisting system.

Listing 1100 includes hair-related descriptors including a position of hairline 1110, a presence of hand on the hair 1111, and a presence/type of hat 1112. Examples of using the position of the hairline 1110 may indicate an incredulous/surprised mood when the position of the hairline is forward, a stressed/expressed expression when the hairline is pulled back, and an indeterminate mood when the hairline is in a neutral position. The presence of a hand on the head 1111 may indicate a stressed mood (e.g., pulling hair out in frustration), tired (e.g., running two hands through the hair), or 'cool' (e.g., running one hand through the hair). A presence/type of hat indicator 1112 may indicate an athletic mood when the hat is a baseball cap (e.g., a upbeat, excited), cockiness/arrogance (e.g., wearing a hat backwards), or formality (e.g., a Sunday bonnet).

The presence/existence/position of wrinkles 1120 may indicate mood and/or state, for example, through the indication of pain when wrinkles appear in the cheek, happiness when angled wrinkles appear around a smile, skepticism/bewilderment when wrinkles appear in the forehead, and unease when concentric wrinkles appear around the mouth.

The presence/position of facial muscles and/or of tension in the muscles 1130 may be used to indicate intensity or determination when the lateral facial or forehead muscles are tense, or relaxedness/contentment when the muscles are not being used. The orientation of the eye structure 1131 may indicate unease/skepticism with a squint, shock or unbelief with an open eye structure, anger with an slight squint, and a neutral or content mood with a normal eye orientation. Eye structure may be determined by identifying the relative positioning between constituent components (e.g., eyelash, eye line, eye-originating wrinkles, and/or the eye itself).

The brow 1140 may indicate anger/skepticism/dislike when furrowed, surprise when raised, and neutrality/happiness when raised. The angle of a furrow may indicate an intensity and/or distinguish between anger/skepticism/dislike.

The mouth structure 1150 may indicate whether a user is responsive to a content selection by mouthing the words, such as the case when the facial structure changes at a frequency appearing in a content selection. The angle of the lips and side of the mouth 1151 and the presence of teeth 1152 may further refine/identify a mood. A smile may indicate happiness, a frown may indicate unhappiness, yelling may indicate anger, and clenched lips may indicate intensity or discomfort.

The presence and/or orientation of facial hair may be used to indicate a mood, or used in conjunction with other components described previously. For example, a presence of muscles may be difficult to determine due to minimal variation in skin color or surface location. However, the tracking the movement of facial hair that mimics or corresponds to the underlying component may be easier to detect given the texture inherent in many forms of facial hair.

In addition to using a component (e.g., a beard, a mustache, a style of glasses, a hat, an earring, a piercing, and/or a tobacco product) to identify a mood, the presence or absence of a component may be used to identify a personality. For example, a goatee may be used to indicate an easygoing personality with a preference for jazz, a full beard may be used to indicate a preference for country, sunglasses may be used to indicate a personality striving for a cool appearance, a set of bifocals may be used to indicate a preference for older or classical genres of music, an earring or piercing may be used to indicate a preference for content on the fringes, a pipe may be used to indicate a preference for classical music, and a cigar may be used to indicate a preference for talk radio.

FIG. 12 is an exemplary user profile for SCREEN_NAME that relates a component in a facial expression to a mood that may be used in a mood-based playlisting system. The mood/facial components are described in a programming construct that may appear in a configuration file or that may be used as a script in a programming construct.

Rule 1210 indicates how a position of a hairline may be used to determine a mood. In the example shown, a default rule indicates that a forward hairline indicates a relaxed mood. When the hairline is set back, a tense mood is inferred which includes the set of anger, anxiety, upset and upset moods. Rule 1211 indicates how the presence of a hand on hair includes a default rule where SCREEN_NAME is deemed tense when a hand lies on the hair. Similarly, rule 1212 indicates that when a baseball cap is being used, then a mood is believed to be relaxed or happy.

Rule 1220 uses a presence and/or position of wrinkles to determine mood information. If wrinkles exist in the forehead, then the mood is determined to include a tense set that includes anger, anxiety, and/or upset moods. If vertical wrinkles exist outside a structure identified as a mouth, then the mood is determined to be anger. If vertical wrinkles exist outside of the eye, then the mood is determined to include pain.

Rule 1230 uses the presence and/or position of facial features (e.g., facial muscles) and/or of tension in the muscles to determine mood information. For example, if the cheeks are believed to be tense, then the mood may be determined to include business moods which includes the set of anxiety and focus moods. In contrast, when the cheeks are believed to be relaxed, the mood may be described as NOT business and NOT tense moods (e.g., any or all moods except the moods found in business and tense mood sets).

Rule 1231 indicates that the orientation of eye structure may be used to determine a mood. In particular, if an eye is squinted, the mood may be deemed nonresponsive, which includes skeptical, dislike, and/or pain moods. If the eye is closed, the mood is determined to include slow moods which includes sleep, bored, and/or relaxed moods. If the eyes are believed to be wide opened, then the moods are determined to include wonder moods that include the moods of shock, amaze, and/or curiosity.

Rule 1240 indicates how brow information may be used in determining a mood. For example, brow information may include a presence of furrowed/unfurrowed brow structures and/or relate to position information. As shown, a furrowed brow is described as a downward brow or a brow with an angle less than 135 degrees.

If a brow is furrowed, then the mood is determined to include a tense mood. In contrast, an unfurrowed brow is defined as an upward brow or a brow at an angle of less than 135 degrees. If the brow is unfurrowed, then the mood is determined to include a relaxed or happy mood.

Rule 1250 describes how the presence/position of a mouth structure may be used to determine mood information. Rule 1251 indicates that the angle of lips and side of mouth may be used in determining a mood. Rule 1252 indicates that the presence of teeth in an image can be used to identify a mood. A smile is determined to exist when the end of the mouth is pointed up or teeth are determined to be together. If a smile is identified, then a mood is determined to include relaxed and happy moods. However, if teeth are identified, but the teeth are not together and a microphone detects yelling, the mood is determined to include angry moods.

As discussed earlier, rule 1260 indicates how the presence or orientation of hair facial hair may be used to determine a mood. When dreadlocks exist, the a mood is determined to be reggae. If the user is unshaven, a mood may not include classical or pop. If a full beard is detected, then the mood may include rock, metal, or country music.

Rule 1270 indicates miscellaneous factors that may be used to indicate a mood. For example, when a pipe is detected, the mood may include relaxed, classical, jazz, and national public radio states.

Rule 1280 prioritizes between different moods. Depending on how the underlying mood is modeled, elements of different moods may be detected. Prioritization provides rules that resolve competing, inconsistent, or differing mood states. For example, a business mood may be favored over a happy mood. A nonresponsive mood may be favored over a tense mood. If children are detected (e.g., background audio signals are identified as screaming or yelling) using the camera or microphone, then no metal music may be played.

Mood conflicts may be resolved using a number of different models. In one model, a dominant mood is identified and content responsive to the dominant mood is selected in response. For instance, imagery provided by a camera may include a smile indicating happiness, strained facial muscles indicating tension, and a set back hair line also indicating tension. In one implementation of the dominant mood model, tension is identified as a dominant mood since the majority of the detected moods indicate the user is experiencing tension. In another variation, tension may be defined as a dominant mood over happiness by virtue a rule that specifies that tension should be used as the mood even when happiness is detected. Identifying the dominant mood may include using a ranked list of moods, or a collection of relative mood preferences. Yet another variation may include deriving metrics for the magnitude of any one mood state and comparing the metrics associated with the mood. Thus if a user has a larger smile or maintains a smile over a longer duration while momentarily presenting a tense appearance, the happiness associated with the smile of the longer duration may be identified as the dominant mood.

In another model, the mood-based playlisting system may select one of several identified moods to accomplish the objective. For instance, if the mood-based playlisting system determines that a user may be experiencing tiredness, happiness, and shock, the mood-based playlisting system may attempt to work with the happiness mood to realize objectives. When a user is nonresponsive to content oriented towards the happiness mood, another mood may be used.

In one implementation, several models for resolving conflicts may be used. For example, a hybrid of models may be used so that, if assimilating multiple models indicates a prevailing mood state, suggests a particular transition, or identifies a particular content selection, the indicated state, transition, or selection may be used. Separately or in addition, if user responsiveness indicates that one model is more effective than another model, the more effective model may be used for those configurations and environments for which the more effective model is deemed effective. When configuration and environmental data indicates that another model is more effective, then the other model may be used.

Rule 1290 allows a mood state to be more customized, that is, more precisely tailored to associate content with a mood. The customization may be applied to a subscriber community, a listening audience associated with an Internet radio station, a demographic, or user. For example, rock has been modified to exclude ARTIST1 and ARTIST2. A talk mood has been modified to exclude TALK_SHOW_HOST_1. Happy includes METAL and ROCK and does not include POP unless ARTIST3 is singing or SONG4 is provided.

Figure 13A:
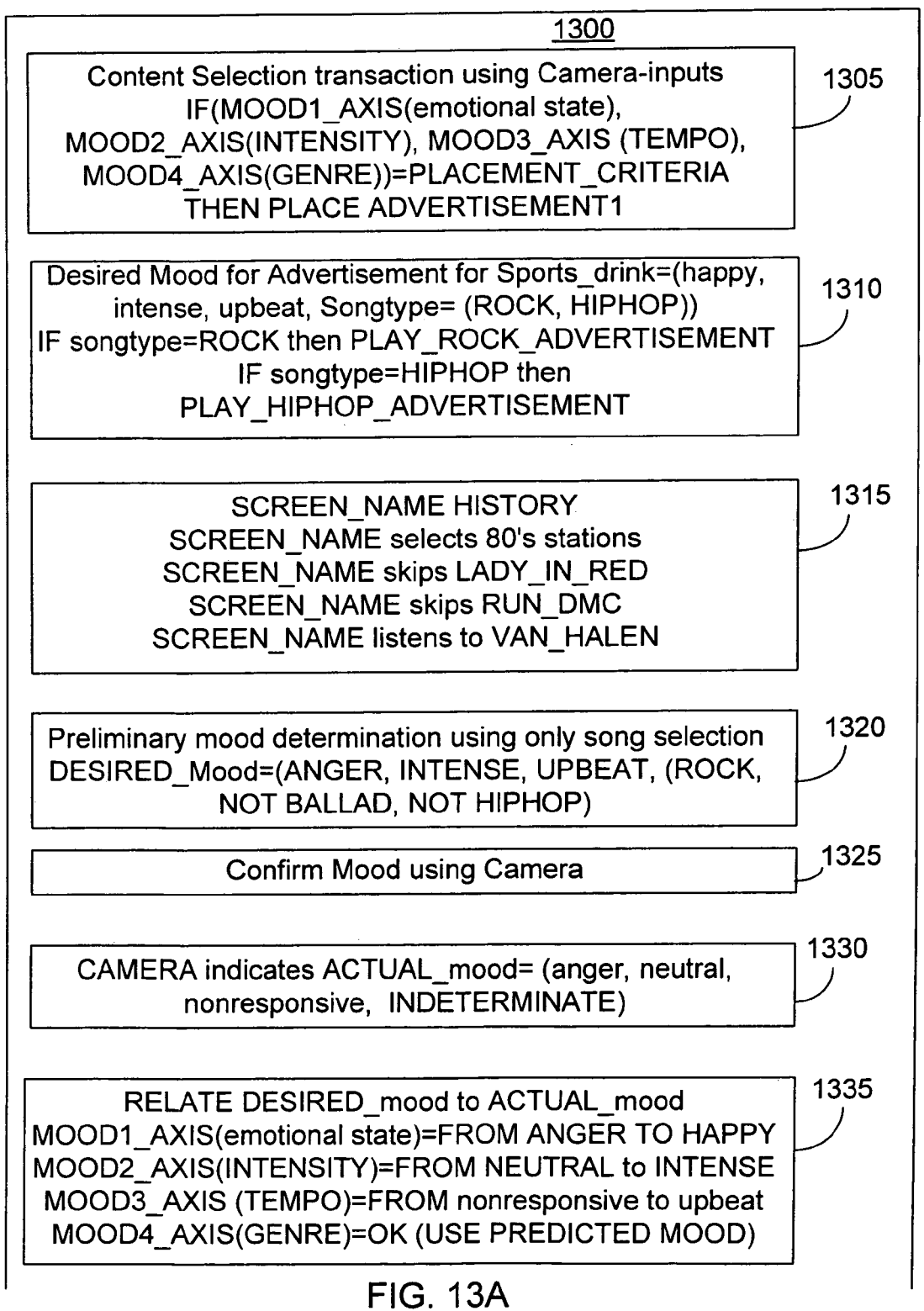
FIG. 13 illustrates an exemplary scripted sequence of operations for a mood-based playlisting system configured to provide content using mood-based selection criteria based in part on a camera to provide mood information.

FIG. 13 illustrates an exemplary scripted sequence of operations 1300 for a mood-based playlisting system configured to provide content using mood-based selection criteria based, relying in part, on a camera to provide mood information. Generally, sequence 1300 represents the operations that are performed and the results that are realized using the mood-based playlisting system with camera inputs. In one implementation, the sequence of operations 1300 represents actual entries appearing in a log used by a mood-based playlisting system. In another example, the sequence of operations 1300 represents a sequence of procedural calls and resultant data.

Operation 1305 is a conditional function that specifies placement of ADVERTISEMENT1 in response to the condition that an emotional state, an intensity, a tempo, a genre lead to PLACEMENT_CRITERIA. For example, rule 1305 may be invoked in anticipation of or upon reaching of a commercial break at the end of a sequence of content selections.

Operation 1310 indicates that an advertisement for a sports drink should be played when the mood is happy, intense, upbeat, and the song type (e.g., genre) is rock or hip hop. When the song type is rock, then a rock advertisement should be placed. When the song type is hip hop, then a hip hop advertisement may be placed.

Operation 1315 provides a history for an online identity identified as SCREEN_NAME. The history may be used to understand or determine a user's perceived mood state and/or recent transitions in mood. Thus, a user may have selected an 80's station, skipped the "The Lady in Red" and Run DMC, and listened to Van Halen in the preceding sequence. A preliminary mood determination is made using only the previous sequence. As a result, operation 1320 predicts a mood state as anger, intense, upbeat, rock, not ballad (e.g., based on the user skipping the ballad "The Lady in Red"), and not hip hop (e.g., based on the user skipping hip hop songs by Run DMC). Thus, past perceived mood transitions may be used as a basis for future determination of how/whether/when to invoke transitions from their current mood to a desired mood. A log of past perceived mood transitions may be recorded for a user (or community of users). The log may record a user's facial expressions captured during the course of the rendering content selections so that the perceived mood transitions is based on imagery-based mood state determinations.

Operation 1325 specifies that the mood should be confirmed using a camera. In operation 1330, the camera indicates that the actual mood is anger, neutral, nonresponsive, and indeterminate.

Thus, as a result, the desired mood state may be related to the actual mood state. As shown in operation 1335, differences between the desired mood state and the actual mood state may be used to indicate that the user needs to transition from anger to happy, from neutral to intense, and from nonresponsive to upbeat. If the genre is ok, and the existing mood may be used.

In operation 1340, the mood indicator library is queried to identify a content selection that supports the transition.

In response to the query, in operation 1345, the mood indicator library (e.g., mood indicator library 340 in FIG. 3) returns data indicating that if a rock advertisement is placed, 50% of users will listen through the end of commercial. The mood indicator library also indicates that advertisers will not pay for a 50% retention. If Huey Lewis is used as an intermediary track before the commercial, then the retention likelihood becomes 75%. On the other hand, if the intermediary track includes Bon Jovi's "Living on a Prayer", the likelihood is 90%. The cost per Huey Lews is $0.0001 per listener, the cost per Bob Jovi is $0.0011. The reimbursement from the advertiser is 75% while the reimbursement at 90% is $0.003

As a result, Bon Jovi living on a prayer is selected in operation 1355. The predicted mood is happy, intense, upbeat, and rock. The differences in cost compared to efficiency need not be the determinative factor. For example, some advertisers may go to extraordinary lengths to preserve brand awareness or perception (e.g., is the advertised product deem "cool'). One measure of brand awareness may include retention rates. Thus, an advertiser concerned about brand perception may pay a premium to ensure the highest retention.

In operation 1360, imagery data is analyzed to determine the actual mood. For example, data from the camera indicates that the actual mood is happy, intense, nonresponsive, and rock. The predicted mood is related to the actual mood. The emotional state, tempo, and genre are acceptable. However, the intensity needs to change from nonresponsive to upbeat.

To change the intensity from nonresponsive to upbeat, the mood indicator library is queried to provide a content selection that supports the mood transition. In operation 1370, the mood indicator library indicates that 85% will listen to entire commercial if the rock advertisement is played now, and that 95% will listen to the entire commercial if the Grateful Dead's "Touch of Gray" is played. As a result, the advertiser reimbursement at 85% is $0.0025 while the reimbursement at 95% is $0.005. To realize the increased reimbursement, a "Touch of Gray" is played in operation 1375.

The camera is used confirm that the actual mood is in fact happy, intense, upbeat, and rock (in operation 1380), and that the rock advertisement is played in operation 1385.

To confirm recipient response, the camera is used to generate imagery data, which confirms that the actual mood during the rock advertisement was happy, intense, upbeat, and rock. In operation 1390, the media player indicates that SCREEN_NAME listened to entire selection and that the user selected the advertisement, entitling advertiser to a bonus.

Figure 14:
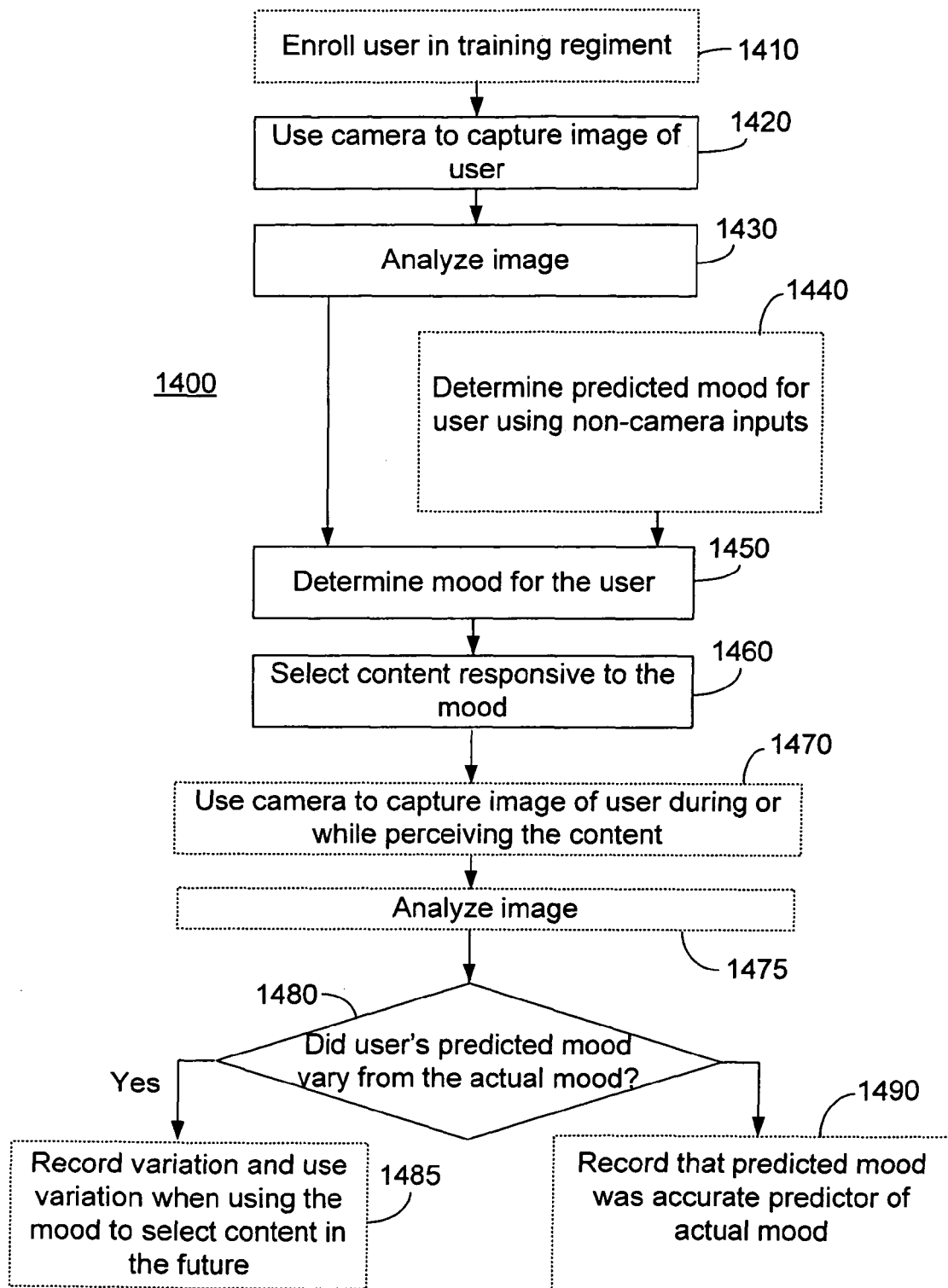
FIG. 14 is a flow chart of an exemplary process by which a user's mood variations may be recorded.

FIG. 14 is a flow chart of an exemplary process 1400 by which a user's mood variations may be recorded. Generally, the operations in process 1400 may be used in conjunction with the systems and configures described elsewhere in the document. For example, at operation 1450, the underlying mood models described with respect to FIGS. 2A-2D, 12, and 13 may be used to determine a mood for the user and select content responsive to the mood. Moreover, the operations may be performed on the player 130 and/or the mood-based playlisting system 300 described in FIGS. 1 and 3, respectively. For convenience, particular components and messaging formats described earlier are referenced as performing the process. However, similar methodologies may be applied in other implementations where different components are used to define the structure of the system, or where the functionality is distributed differently among the components shown.

Initially, a user is enrolled in a training regimen (1410). For example, a user may be presented with a content selection and asked to specify a resultant mood. In another example, a user is asked to present a face associated with different moods. One example of a training regimen is shown in FIGS. 8-10.

Once the mood-based playlisting system has been trained, a camera is used to capture an image of the user (1420), and the image is analyzed (1430). For example, the image may be analyzed using the rules and configures described in FIGS. 12 and 13. In addition, the predicted mood may be optionally determined using non-camera inputs (1440). For example, the mood-based playlisting system may determine a mood based on a selected station or channel or by reference a past historical reference for a user's mood.

The mood is determined for the user (1450), and content responsive to the mood is selected (1460). A camera is used to capture an image of the user during or while perceiving the content (1470), and the image is analyzed to determine an actual mood state (1480).

The mood-based playlisting system determines whether a predicted mood varies from the actual mood (1480). If so, the variation is recorded and used when selecting content in the future (1485). If not, the mood-based playlisting system may record that the predicted mood was an accurate predictor of the actual mood (1490). For example, the variation or accuracy may be provided to the mood indicator library 340 described in FIG. 3.

Figure 15:
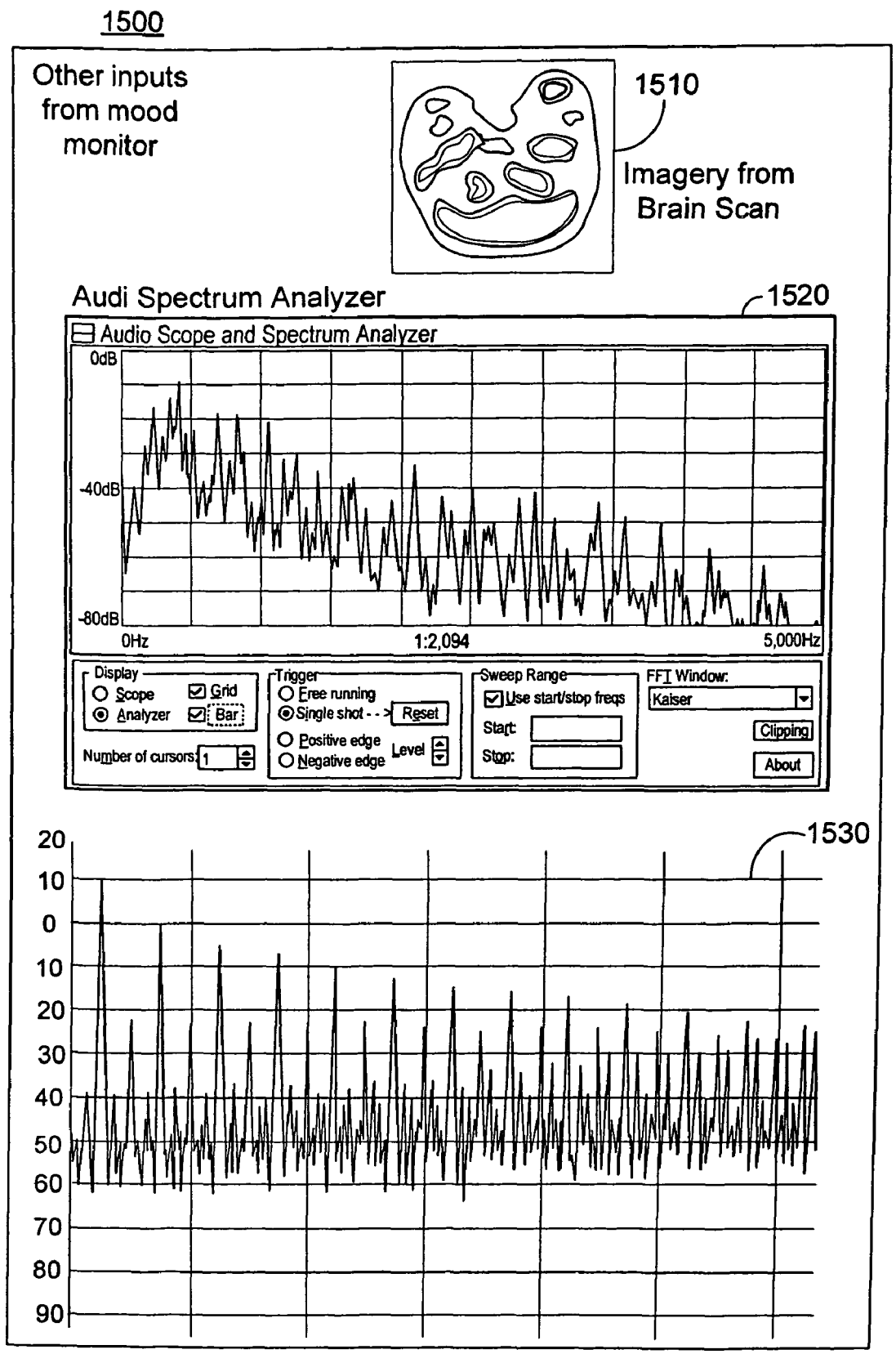
FIG. 15 is an exemplary GUI that illustrates how different inputs may be used as a mood sensor into a mood-based playlisting system.

FIG. 15 is an exemplary GUI 1500 that illustrates how different inputs may be used as a mood sensor into a mood-based playlisting system. While data provided by the sensors may differ from other data provided by other sensors in the mood-based playlisting system, the data provided by the sensors shown in UI 1500 may be associated with different mood states and used in a mood-based playlisting system. Furthermore, while some sensors may use a different form factor that constrains where the sensors may be used, using different sensors in different circumstances enables the mood-based playlisting system to realize feature sets difficult to otherwise achieve. For example, interface 1510 illustrates neural activity in imagery provided by a brain scan. In some implementations, the form factor of the radiology equipment may limit the use of the radiology equipment to laboratory and medical environments. However, the radiology equipment may provide a degree accuracy not easily obtained through other sensors. And, the data provided by the radiology equipment may be used to generate a more sophisticated model, which in turn may lead to more accurate results. As shown, the interface 1510 indicates neural activity in a particular area of the brain associated with a particular mood.

Interface 1520 illustrates data provided by an audio spectrum analyzer. Mood information may be derived by associating a certain frequency or arrangement of frequencies with a mood.

Interface 1530 illustrates data provided by an electronic signal monitor. For example, synaptic activity indicative of a mood state may be detected by a probe attached to the user. The relative intensity or frequency may be used to indicate a mood state for the attached user. In one implementation, a degree of tension may be determined and used to generate the mood state.

Other implementations are within the scope of the following claims. For example, although the mood-based playlisting system has been described in the context of a distributed system that may support multiple devices, the mood-based playlisting system may be distributed across multiple systems and/or reside at a client device. One example of the mood-based playlisting system being distributed across multiple devices may include having a portion of the mood-based playlisting system that operates in a data center where the content library and mood indicator library reside. These data center systems may interface with software that operates a mood calculator and content retrieval program to retrieve the content library from the central systems.

Alternatively, the mood-based playlisting system may be more client-focused and may perform more operations on the client. For example, the mood-based playlisting system described in FIG. 3 may be implemented on a personal audio system. The personal audio system may store multiple selections of content in memory and generate the playlist that maintains the mood of the content that has been stored. Alternatively, the mood-based playlisting system may include a network-based device that implements the content selection and playlisting on the client device but retrieves content from a network-based content library.

The mood-based playlisting system may be configured to preserve some measure of variation within the playlist. Thus, the mood-based playlisting system may be configured to recognize that if three country ballads having moods that have been gauged as depressing are played, the playlist should then select a country song having a mood that has been gauged as uplifting. These variation rules may be described digitally and distributed as programming criteria alongside or in conjunction with other licensing restrictions. For example, a license may govern the frequency with which an artist or song may be played. In addition to the frequency licensing restrictions, the content distributor may distribute a mood-based playlisting rule set along with an electronic library to regulate access to the content.

Although the mood has been described in the context of content being played, other techniques may be used to infer the mood. For example, the client device may monitor how the user interfaces with the media player. Monitoring a volume level, monitoring changes to the volume level, and monitoring whether a user changes an Internet radio station are examples of operations that may be used to infer the mood. For example, when a media player detects that a user reduces the volume level when a new track begins, the media player may determine that the user is experiencing a less intense mood. In contrast, when the user increases the volume, the media player may determine that the user's mood intensifies.

The user interaction with the media player also may be analyzed with respect to the content that is accessed. For example, if the user skips to the next track immediately after accessing a new track, the media player may determine that the user's mood does not like the skipped track. The user's action may be extrapolated so that a mood that is the inverse of the mood of the rejected content is inferred. To illustrate, a user may initially select a country music Internet Radio station. The sequence of content transmitted to the user may include a country rock song, followed by a country ballad, followed by a country rock song. When the user listens to the first country rock song, skips the country ballad, and listens to the second country rock song, the media player (or host) may determine that the user's mood reflects a preference for country rock.

Although the description of a mood indication made distinctions between the style and genre, the mood indications also may be made with respect to other factors, including the artist, the tempo, the era in which the content originated, the album, and/or other categorization. For other forms of media (e.g., video or data), the mood indications may include moods related to the identity of the producer, director, actors, and/or content rating (child, teen, all-ages) in addition to the category of the programming.

Analyzing the user's interactions to determine the mood is not limited to the user's interaction with a media player. A user's interaction with an Instant Messaging program, an electronic mail program, or an Internet Web browser are examples of other user activities that may be used to determine the mood. Thus, when a user is typing quickly and exchanging messages with many other users, an intense mood may be inferred. In contrast, when the user is determined to be reading web pages at a slower pace, a relaxed mood may be inferred. The content in the user interaction also may be used in determining the mood. Thus, the content appearing in a web page accessed by the user may be used to determine the mood for the user.

Although many of the previously described examples link a certain activity or type of content with a certain mood, the examples illustrate just one mood that can be associated with an activity. Other moods may be associated with the activity or type of content. A selection of content or a user activity also may be associated with multiple moods. An example of content with multiple moods may include a song with an uplifting melody and depressing lyrics. A mood-based playlisting system may use either or both moods in selecting future content. If the mood-based playlisting system sought to place an advertisement/product with the uplifting mood indication, the mood-based playlisting system may incorporate the uplifting mood in the transition. If the mood-based playlisting system did not have an intended mood destination in mind, the mood-based playlisting system may continue to select content with multiple mood elements to allow for an easier transition to a wider variety of content. A larger mood volume may represent the multiple elements with greater dimensions across multiple axes.

Although the mood-based playlisting system has been described using playlists, the mood-based playlisting system need not assemble an actual playlist of songs. Rather, the content selection may be made on a selection-by-selection basis. The list of songs selected in this manner may form a playlist.

Although the mood-based playlisting system has been described in the context of determining the mood state for a user, the mood-based playlisting system may be used to determine a mood state and select content for a group of users. This may include selecting content for large Internet audiences. For example, the individual mood states for individual members of a large audience may be aggregated to determine a collective mood state for the large audience.

In one example, the determining collective mood state may include sampling individual members of the audience for their mood states and using the sampled mood information to generate a collective mood state. In another example, an audience listening to one content source may be analyzed as a collection of groups. The mood-based playlisting system may analyze each individual group to determine whether the mood state of the group is consistent with the content being selected. When the mood state for one of the groups indicates that the mood state for the group is not compatible with the mood state for a content selection, the mood-based playlisting system may reconfigure the selection of content. In one example, the group experiencing the mood state incompatibility may be transitioned to a different stream/playlist to preserve the mood state compatibility. In another example, the mood-based playlisting system may select different content designed to retain the group experiencing the mood state incompatibility. This may include determining that more users are likely to be retained from the group experiencing the mood state incompatibility than are lost from other groups not experiencing the mood state incompatibility.

The mood-based playlisting system may disperse and group users. Users may be grouped to reduce costs, to take advantage of discounts for larger audiences, and to allow a limited pool of content to serve a larger community. This may include transmitting the same advertisement or segment lead to multiple users. The mood-based playlisting system also may disperse users from a common group. For example, a group of users may be accessing a host to access a popular selection of content. The mood-based playlisting system then may personalize the content based on the determined mood so that the users are retained at a higher rate using the mood-based playlisting system.

The mood-based playlisting system may normalize a mood indication to a designated location or region. The normalization may be done irrespective of whether targeted content is designated for the user. For example, the mood-based playlisting system may determine that operating a playlist in a certain mood spectrum or volume retains listeners at a greater rate. In another example, the mood indication for the user is operated in a specified range so that the user may be more receptive to communications delivered through other channels. This may include, for example, an advertisement on television, an electronic mail message, a telephone call, a Web-based advertisement, or an instant message. In yet another example, an advertiser may want a certain mood to be associated with a product. For example, a marketing firm may want a 'happy' mood associated with the firm's content.

When calculating a mood transition, the mood-based playlisting system may reexamine the actual mood state during the transition and determine if the actual mood state matches the intended mood state. For example, although the mood state of the content may indicate that a user should be in a relaxed mood, the user's activities on their client may indicate that the user's mood state is not mellow (e.g., the user is experiencing stress or anxiety). The mood-based playlisting system may dynamically respond to the actual mood state. In one example, the mood-based playlisting system may select content associated with a different mood destination that is more compatible with the user's actual mood state. Thus, instead of playing an advertisement associated with a mellow mood, the mood-based playlisting system may select an advertisement with a mood that is compatible with the actual mood of the user.

The mood based-playlisting system may include a detailed records system for reporting and accounting. For example, the mood-based playlisting system may record the moods of the user, the mood transition between tracks, and the percentage of users that are retained for the transition. Other records may include advertising effectiveness based on the mood, and user listening habits (e.g., duration, user preferences). The records may be refined in an automated manner to develop mood trending information. The mood-based playlisting system may generate automated reports for system administrators and advertisers to improve the enjoyment, effectiveness, and/or success of the mood-based playlisting system. This may include a report indicating that a different programming sequence may result in an increased response rate to an advertisement.

The mood-based reporting system may transmit several different sequences of content to determine the relative efficacy of the different sequences. The mood-based reporting system then may present the results to a system administrator and enable the system administrator to control future content selection using the reported relative efficacy information. The reporting system may present results using different mood metrics. For example, a first report may be based on only the mood of the content while a second report may gauge the user interaction with the media player. The reporting system then may analyze the differences, and interpret the variation. The interpretation of the variation then may be used by a system administrator to plan future programming.

In another implementation, a computer program may be configured to manage content accessed by a user by using a mood-based playlisting system to plot a transition from a first track to a second track using at least one intermediary track. A mood originating point may be determined for the first track, and an intermediary track configured to realize a specified mood transition may be selected. The intermediary track may be rendered and a camera may be used to capture an image of the user during the rendering of the content. The image may be analyzed to realize an actual mood state, and the actual mood state may be used to determine if the specified mood transition has been realized. When the specified mood transition has been realized, the transition may proceed. When the specified mood transition has not been realized, the actual mood may be used to select a different transition track.

In still another variation, a computer program may be configured to manage electronic content made available to users. A first content selection may be rendered, and a camera may be used to capture an image of the user during rendering. The image may be analyzed to determine an actual mood indicator for the user. A mood spectrum may be determined to describe other mood indicators that are consistent with the actual mood. Finally, a next content selection may be selected having a second mood indicator that lies within the mood spectrum.

What is claimed is:

1. A computer program on a non-transitory computer readable storage device configured to manage content accessed by a user, the computer program being structured and arranged to:
   use a camera to capture an image of the user;
   analyze the image to determine an actual mood for the user;
   identify a desired mood state indicating a intended mood value for the user for a designated event; and
   determine whether the user is ready to participate in the designated event by:
   comparing the actual mood to the desired mood state; and
   based on results of the comparison, selecting transitional content for the user if the comparison indicates that the actual mood does not support the desired mood state, the transitional content selected to inspire transition of the actual mood to the desired mood state, and
   selecting destination content associated with the designated event if the comparison indicates that the actual mood does not support the desired mood state.

2. The computer program of claim 1 wherein analyzing the image to determine the actual mood for the user includes analyzing one or more facial expressions for the user.

3. The computer program of claim 2 wherein analyzing the facial expressions includes at least one of:
   determining if a brow is furrowed to indicate an angry mood, an upset mood, or an intensity of a mood,
   determining if the brow is unfurrowed to indicate a neutral mood, a content mood, or a mood of lesser intensity, and
   analyzing a user's mouth features to determine if the user is smiling, frowning, angry, experiencing an intense mood, or experiencing a neutral mood.

4. The computer program of claim 2 wherein analyzing the facial expression includes identifying a change in a location of a facial feature, and using the change in the location to determine the actual mood.

5. The computer program of claim 4 wherein analyzing the change in the location of the facial feature includes determining that a brow, a wrinkle, a dimple, a hairline, an ear, a nose, a mouth, or a chin is located in a different location.

6. The computer program of claim 1 wherein analyzing the image to determine the actual mood includes:
comparing current information related to a current image with previous information related to a previous image;
identifying a differential describing how the current information differs from the previous information; and
using the differential to determine the actual mood.

7. The computer program of claim 1 wherein analyzing the image to determine the actual mood includes:
identifying a level of user movement, and
using the user movement to determine the mood.

8. The computer program of claim 7 wherein:
identifying the level of user movement includes identifying a rhythmic motion, and
using the user movement to determine the mood includes using the rhythmic motion to identify the actual mood.

9. The computer program of claim 1 further comprising:
determining that selected content did not transition the user to the desired mood, and
adjusting a user profile to reflect a variation between the predicted mood and the actual mood.

10. The computer program of claim 1 further comprising:
enrolling the user in a training regimen to determine a user profile for the user; and
using the user profile determine the actual mood for the user.

11. The computer program of claim 10 wherein enrolling the user in the training regimen includes associating one or more facial expressions of the user with one or more moods.

12. The computer program of claim 10 wherein enrolling the user in the training regimen includes evaluating a user response to one or more selections of content.

13. The computer program of claim 12 wherein evaluating the user response to the one or more selections of content includes:
generating perceivable output for a first content selection;
presenting an image of the user captured in response to the generation of the perceivable output; and
prompting the user to specify the actual mood as depicted in the image.

14. The computer program of claim 13 further comprising enabling the user to identify facial features indicative of the actual mood.

15. The computer program of claim 12 wherein evaluating the user response to the one or more selections of content includes:
generating perceivable output for a first content selection; and
prompting the user to specify the actual mood.

16. The computer program of claim 10 wherein enrolling the user in the training regimen includes prompting the user to confirm that a mood determined by evaluating an image relates to an actual mood.

17. The computer program of claim 10 wherein enrolling the user in the training regimen includes generating perceivable output from a content selection configured to test the user's response;
using the image to evaluate a user's response;
generating a mood model using the user's response; and
selecting content using the mood model.

18. The computer program of claim 17 further comprising repeating the operations of:
generating additional perceivable output from the mood impulse content selection; and
using the image to evaluate the mood impulse response to generate a comprehensive mood impulse response function such that additional mood information for different moods is gleaned.

* * * * *